US009348515B2

(12) United States Patent
Kaneko et al.

(10) Patent No.: US 9,348,515 B2
(45) Date of Patent: May 24, 2016

(54) COMPUTER SYSTEM, MANAGEMENT COMPUTER AND STORAGE MANAGEMENT METHOD FOR MANAGING DATA CONFIGURATION BASED ON STATISTICAL INFORMATION

(75) Inventors: Satoshi Kaneko, Sagamihara (JP); Akira Yamamoto, Sagamihara (JP); Tsukasa Shibayama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 13/139,664

(22) PCT Filed: Mar. 22, 2011

(86) PCT No.: PCT/JP2011/001680
§ 371 (c)(1),
(2), (4) Date: Jun. 14, 2011

(87) PCT Pub. No.: WO2012/098591
PCT Pub. Date: Jul. 26, 2012

(65) Prior Publication Data
US 2012/0185644 A1    Jul. 19, 2012

(30) Foreign Application Priority Data
Jan. 17, 2011    (JP) ................................. 2011-007260

(51) Int. Cl.
G06F 12/00    (2006.01)
G06F 12/02    (2006.01)
G06F 3/06    (2006.01)

(52) U.S. Cl.
CPC .............. *G06F 3/061* (2013.01); *G06F 3/067* (2013.01); *G06F 3/0647* (2013.01); *G06F 3/0653* (2013.01)

(58) Field of Classification Search
CPC ... G06F 3/0647; G06F 3/0635; G06F 3/0689; G06F 3/0631; G06F 3/061; G06F 3/0613; G06F 2211/1028; G06F 2211/1057; G06F 3/0608; G06F 3/0653; G06F 3/0626; G06F 3/0644; G06F 8/71; G06F 11/203; G06F 3/0604
USPC .......... 711/114, E12.001, E12.002, 154, 170, 711/165
See application file for complete search history.

(56) References Cited

U.S. PATENT DOCUMENTS 7,627,731 B2 * 12/2009 Sugino et al. ................. 711/170
8,065,431 B2 * 11/2011 Taylor et al. .................. 709/236
(Continued)

FOREIGN PATENT DOCUMENTS

JP    2007-280089 A    10/2007
JP    2008-047156    2/2008
(Continued)

OTHER PUBLICATIONS

PCT International Search Report and Written Opinion on application No. PCT/JP2011/001680 dated May 17, 2011; 10 pages.

*Primary Examiner* — Yong Choe
*Assistant Examiner* — Edward Waddy, Jr.
(74) *Attorney, Agent, or Firm* — Foley & Lardner LLP

(57) ABSTRACT

A storage apparatus comprises a storage device storing data which is read/written by a host computer and a control device for controlling data writing to the storage device. The control device provides a predetermined storage area of the storage device to the host computer as one or more volumes and, in response to the request from the management computer, provides statistical information relating to the storage areas to the management computer. the management computer comprises a storage device storing a storage area management table for managing the storage area of a plurality of storage apparatuses and a control device for managing the configuration of the storage areas of the storage apparatuses. The control device manages the data configuration of the plurality of storage apparatuses on the basis of the statistical information relating to the storage areas of the storage apparatuses which is provided by the plurality of storage apparatuses.

8 Claims, 19 Drawing Sheets

(56) References Cited

U.S. PATENT DOCUMENTS

| | | | |
|---|---|---|---|
| 8,407,417 B2* | 3/2013 | Matsuda et al. | 711/114 |
| 2006/0026373 A1* | 2/2006 | Kaneda et al. | 711/162 |
| 2006/0155928 A1* | 7/2006 | Mimatsu | G06F 3/0607 711/112 |
| 2007/0113007 A1* | 5/2007 | Murayama et al. | 711/114 |
| 2007/0118710 A1* | 5/2007 | Yamakawa | G06F 3/061 711/165 |
| 2007/0130423 A1* | 6/2007 | Liu et al. | 711/114 |
| 2007/0162716 A1* | 7/2007 | Yagisawa | G06F 11/1435 711/162 |
| 2007/0239954 A1* | 10/2007 | Sakashita | G06F 3/061 711/165 |
| 2008/0028049 A1* | 1/2008 | Taguchi et al. | 709/220 |
| 2008/0091898 A1 | 4/2008 | Takahashi et al. | |
| 2008/0104339 A1* | 5/2008 | Nakagawa et al. | 711/154 |
| 2008/0104350 A1* | 5/2008 | Shimizu | G06F 3/0605 711/165 |
| 2008/0104443 A1 | 5/2008 | Akutsu et al. | |
| 2008/0201544 A1* | 8/2008 | Nakajima et al. | 711/166 |
| 2009/0182930 A1* | 7/2009 | Taguchi et al. | 711/100 |
| 2009/0248759 A1* | 10/2009 | Okada et al. | 707/204 |
| 2009/0265511 A1* | 10/2009 | Fujita | G06F 3/0607 711/114 |
| 2009/0292870 A1* | 11/2009 | Sambe et al. | 711/114 |
| 2009/0300283 A1* | 12/2009 | Kudo | G06F 3/061 711/114 |
| 2009/0307422 A1* | 12/2009 | Galloway | G06F 11/1076 711/114 |
| 2010/0049917 A1* | 2/2010 | Kono et al. | 711/114 |
| 2010/0211949 A1 | 8/2010 | Nakajima et al. | |
| 2010/0235604 A1* | 9/2010 | Oe et al. | 711/170 |
| 2010/0325378 A1 | 12/2010 | Maruyama et al. | |
| 2010/0332882 A1* | 12/2010 | Nayak | G06F 3/0625 713/324 |
| 2011/0264855 A1* | 10/2011 | Kasako | 711/114 |
| 2012/0102350 A1* | 4/2012 | Belluomini et al. | 713/324 |
| 2012/0198151 A1* | 8/2012 | Kato et al. | 711/114 |

FOREIGN PATENT DOCUMENTS

| | | |
|---|---|---|
| JP | 2008-134987 A | 6/2008 |
| JP | 2008-203937 | 9/2008 |
| JP | 2010-191524 A | 9/2010 |

* cited by examiner

FIG. 4

| VOLUME IDENTIFIER | LOGICAL START ADDRESS | LOGICAL END ADDRESS | POOL IDENTIFIER | RESOURCE IDENTIFIER | PHYSICAL START ADDRESS | PHYSICAL END ADDRESS |
|---|---|---|---|---|---|---|
| 0 | 0 | 999 | 1 | 0 | 1000 | 1999 |
|  | 1000 | 1999 |  | 1 | 0 | 999 |
|  | 2000 | 2999 |  | 2 | 0 | 999 |
|  | 3000 | 3999 |  | 2 | 1000 | 2999 |
|  | 4000 | 199999 |  | null | null | null |
| ... | ... | ... | ... | ... | ... | ... |
| 12120 | 12121 | 12122 | 12123 | 12124 | 12125 | 12126 |

| POOL IDENTIFIER | RESOURCE IDENTIFIER | RESOURCE TYPE | RESOURCE CONFIGURATION |
|---|---|---|---|
| 0 | 0 | FC | INTERNAL |
|   | 1 | FC | INTERNAL |
|   | 2 | SSD | INTERNAL |
| 1 | 3 | FC | EXTERNAL |

| RESOURCE IDENTIFIER | PORT IDENTIFIER | EXTERNAL STORAGE IDENTIFIER | EXTERNAL STORAGE RESOURCE IDENTIFIER | EXTERNAL STORAGE PORT IDENTIFIER |
|---|---|---|---|---|
| 3 | 0 | STORAGE2 | 0 | 1 |
| ⋮ | ⋮ | ⋮ | ⋮ | ⋮ |

| APPARATUS IDENTIFIER | POOL IDENTIFIER | RESOURCE IDENTIFIER | RESOURCE TYPE | RESOURCE CONFIGURATION |
|---|---|---|---|---|
| STRAGE1 | 0 | 0 | FC | INTERNAL |
|  | 1 | 1 | FC | INTERNAL |
|  |  | 2 | SSD | INTERNAL |
|  |  | 3 | FC | EXTERNAL |
|  | 2 | 4 | SATA | EXTERNAL |
| ⋮ | ⋮ | ⋮ | ⋮ | ⋮ |
| 51500 | 51501 | 51502 | 51503 | 51504 |

| STORAGE IDENTIFIER | RESOURCE IDENTIFIER | PORT IDENTIFIER | EXTERNAL STORAGE IDENTIFIER | EXTERNAL STORAGE RESOURCE IDENTIFIER | EXTERNAL STORAGE PORT IDENTIFIER |
|---|---|---|---|---|---|
| STRAGE1 | 3 | 0 | STRAGE2 | 0 | 1 |
|  | 4 | 1 | STRAGE2 | 1 | 2 |
| ⋮ | ⋮ | ⋮ | ⋮ | ⋮ | ⋮ |
| 51550 | 51551 | 51552 | 51553 | 51554 | 51555 |

| APPARATUS IDENTIFIER | VOLUME IDENTIFIER | POOL IDENTIFIER | RESOURCE IDENTIFIER | ASSIGNED SEGMENT COUNT |
|---|---|---|---|---|
| STRAGE1 | 0 | 1 | 1 | 1000 |
| | | | 2 | 1000 |
| | | | 3 | 2000 |
| ⋮ | ⋮ | ⋮ | ⋮ | ⋮ |

| APPARATUS IDENTIFIER | RESOURCE TYPE | READ PERFORMANCE (G/sec) | WRITE PERFORMANCE (G/sec) |
|---|---|---|---|
| STRAGE1 | SSD | 10 | 5 |
| | FC | 8 | 4 |
| | SATA | 3 | 1 |
| ⋮ | ⋮ | ⋮ | ⋮ |

| APPARATUS IDENTIFIER | PORT IDENTIFIER | MAXIMUM IOPS (G/sec) |
|---|---|---|
| STRAGE1 | 0 | 10 |
| | 1 | 8 |
| | 2 | 3 |
| ⋮ | ⋮ | ⋮ |

| APPARATUS IDENTIFIER | VOLUME IDENTIFIER | POOL IDENTIFIER | RESOURCE IDENTIFIER | ASSIGNED SEGMENT COUNT | AVERAGE IOPS |
|---|---|---|---|---|---|
| STRAGE1 | 0 | 1 | 1 | 1000 | 6000 |
| | | | 2 | 1000 | 5000 |
| | | | 3 | 2000 | 3000 |
| ⋮ | ⋮ | ⋮ | ⋮ | ⋮ | ⋮ |
| 51600 | 51601 | 51602 | 51603 | 51604 | 51605 |

| APPARATUS IDENTIFIER | POOL IDENTIFIER | RESOURCE IDENTIFIER | TOTAL NUMBER OF SEGMENTS | ASSIGNED SEGMENT COUNT | AVERAGE IOPS TO ASSIGNED SEGMENTS |
|---|---|---|---|---|---|
| STRAGE1 | 1 | 10 | 1000 | 1000 | 4000 |
| | | 11 | 1000 | 1000 | 3000 |
| | | 12 | 8000 | 2000 | 2500 |
| ⋮ | ⋮ | ⋮ | ⋮ | ⋮ | ⋮ |
| 51900 | 51901 | 51902 | 51903 | 51904 | 51905 |

5190

COMPUTER SYSTEM, MANAGEMENT COMPUTER AND STORAGE MANAGEMENT METHOD FOR MANAGING DATA CONFIGURATION BASED ON STATISTICAL INFORMATION

CROSS-REFERENCE TO RELATED PATENT APPLICATIONS

This application is the US national phase application of PCT Application PCT/JP2011/001680 filed Mar. 22, 2011, which claims priority from Japan Application 2011-007260, filed Jan. 17, 2011. All of the aforesaid applications are incorporated herein by reference in their entirety as if fully set forth herein.

TECHNICAL FIELD

The present invention relates to a computer system, a management computer and a storage management method, and is suitably applied to a computer system which manages data migration of a storage apparatus, and to a management computer and storage management method.

BACKGROUND ART

Recent years have witnessed a trend toward year-on-year increases in the amount of data handled by computer systems, and such increases in the amount of data have been handled by adding new storage apparatuses and migrating data between existing storage systems.

The units of the data migrated between storage systems are units of storage areas which are used by the host computer to store data in the storage apparatuses, namely, for example, logical volumes which are configured from a single hard disk drive (HDD), logical volumes in RAID (Redundant Arrays of Independent Disks) groups configured from a plurality of hard disk drives, or virtual logical volumes (hereinafter called 'virtual volumes') utilizing Thin Provisioning, and the like.

Here, Thin Provisioning is a function which provides virtual volumes to a host computer and which, when there is a request from the host computer to write data to a virtual volume, dynamically assigns a physical storage area for storing data to the virtual volume. With such Thin Provisioning, a virtual volume which has a greater capacity than the storage area which is actually available can be provided to the host apparatus. Furthermore, most recently, storage management has been efficiently performed by using hard disk drives of a plurality of types of varying performance. For example, according to a management technique known as hierarchical storage management (HSM), storage area is assigned from a high-speed, high-performance storage tier to an area where data of a high access frequency is stored and storage area is assigned from a low-speed, low-performance storage tier to an area where data of a low access frequency is stored.

Furthermore, PTL1 discloses a technology whereby information of a migration-source storage area in which migrated data is stored and information of a data migration-destination storage area are acquired and whereby the time required to migrate the data is calculated and an optimal data migration plan is created. For example, the migration of data of a high access frequency can be migrated by prioritizing the migration of data stored in a high-performance storage tier over the migration of data stored in a low-performance storage tier.

CITATION LIST

Patent Literature

[PTL 1]
Japanese Published Patent Application No. 2008-203937

SUMMARY OF INVENTION

Technical Problem

However, with PTL1, in order to calculate the time required for data migration, the management computer, which manages a plurality of storage apparatuses, is required to acquire all the information relating to an optional storage area from a storage apparatus serving as a data migration source and a storage apparatus serving as a data migration destination. There is therefore a problem in that the data amount transferred between the management computer and the storage apparatuses is enormous, which is apt to degrade the overall performance of the storage system.

The present invention was devised in view of the aforementioned problems, and seeks to propose a storage system capable of efficiently acquiring information relating to storage areas of a storage apparatus, as well as a management computer and storage management method.

Solution to Problem

In order to achieve the foregoing object, the present invention provides a computer system in which a plurality of storage apparatuses, a plurality of host apparatuses which issue a data writing request to the plurality of storage apparatuses, and a management computer which manages the plurality of storage apparatuses and plurality of host apparatuses are interconnected via a network. The storage apparatus comprises a storage device which stores data which is read/written by the host computer; and a control device which controls the data writing to the storage device, wherein the control device provides a predetermined storage area of the storage device to the host computer as one or more volumes and provides statistical information relating to the storage areas to the management computer in response to a request from the management computer, wherein the management computer comprises a storage device for storing a storage area management table which manages storage areas of the plurality of storage apparatuses, and a control device for managing the configuration of the storage areas of the plurality of storage apparatuses, and wherein the control device manages the data configuration of the plurality of storage apparatuses on the basis of statistical information relating to the storage areas of the storage apparatuses and which is provided by the plurality of storage apparatuses.

According to this configuration, the storage apparatus provides a predetermined storage area of the storage apparatus to the host computer as one or more volumes, the management computer issues a request for the statistical information relating to the storage areas to the storage apparatus, the storage apparatus provides the statistical information relating to the storage areas to the management computer in response to the request from the management computer, and the management computer manages the data configuration of the plurality of storage apparatuses on the basis of the statistical information relating to the storage areas of the storage apparatuses which is provided by the plurality of storage apparatuses. Accordingly, even when not all the information relating to the storage area stored in the storage apparatus is acquired, because the migration time of data stored in the storage apparatus and the data I/O performance at the data migration destination can be calculated by acquiring the statistical information of the storage areas, the amount of transferred data and the transfer time can be greatly shortened.

Advantageous Effects of Invention

The present invention makes it possible to prevent degradation of the overall performance of a storage system by efficiently acquiring information relating to storage areas of storage apparatuses.

BRIEF DESCRIPTION OF DRAWINGS

FIG. 4 is a diagram showing an example of a storage physical and logical storage area mapping table according to the first embodiment.

FIG. 6 is a diagram showing an example of a resource configuration table according to the first embodiment.

FIG. 7 is a diagram showing an example of a storage external storage configuration table according to the first embodiment.

FIG. 10 is a diagram showing an example of a resource management table according to the first embodiment.

FIG. 11 is a diagram showing a management external storage configuration table according to the first embodiment.

FIG. 12 is a diagram showing an example of a management physical and logical storage area mapping table according to the first embodiment.

FIG. 13 is a diagram showing an example of a disk type performance information table according to the first embodiment.

FIG. 14 is a diagram showing an example of a port performance information table according to the first embodiment.

FIG. 20 is a diagram showing an example of a management physical and logical storage area mapping table according to the second embodiment.

FIG. 21 is a diagram showing an example of a management pool physical and logical storage area mapping table according to the second embodiment.

DESCRIPTION OF EMBODIMENTS

Embodiments of the present invention will be described in detail hereinbelow with reference to the drawings.

Note that, in the following description, information on the present invention is provided using expressions such as 'aaa table,' but this information may also be expressed using data structures other than a table. Hence, in order to express this idea that there is no dependence on data structure, 'aaa table,' 'aaa list,' 'aaaDB,' and 'aaa queue' and so on will sometimes also be referred to as 'aaa information.' Furthermore, although expressions such as 'identification information,' identifier, 'first name,' 'name,' and 'ID' are used when describing the content of each information item, such expressions are interchangeable.

(1) First Embodiment (1-1) Configuration of Computer System

Figure 1:
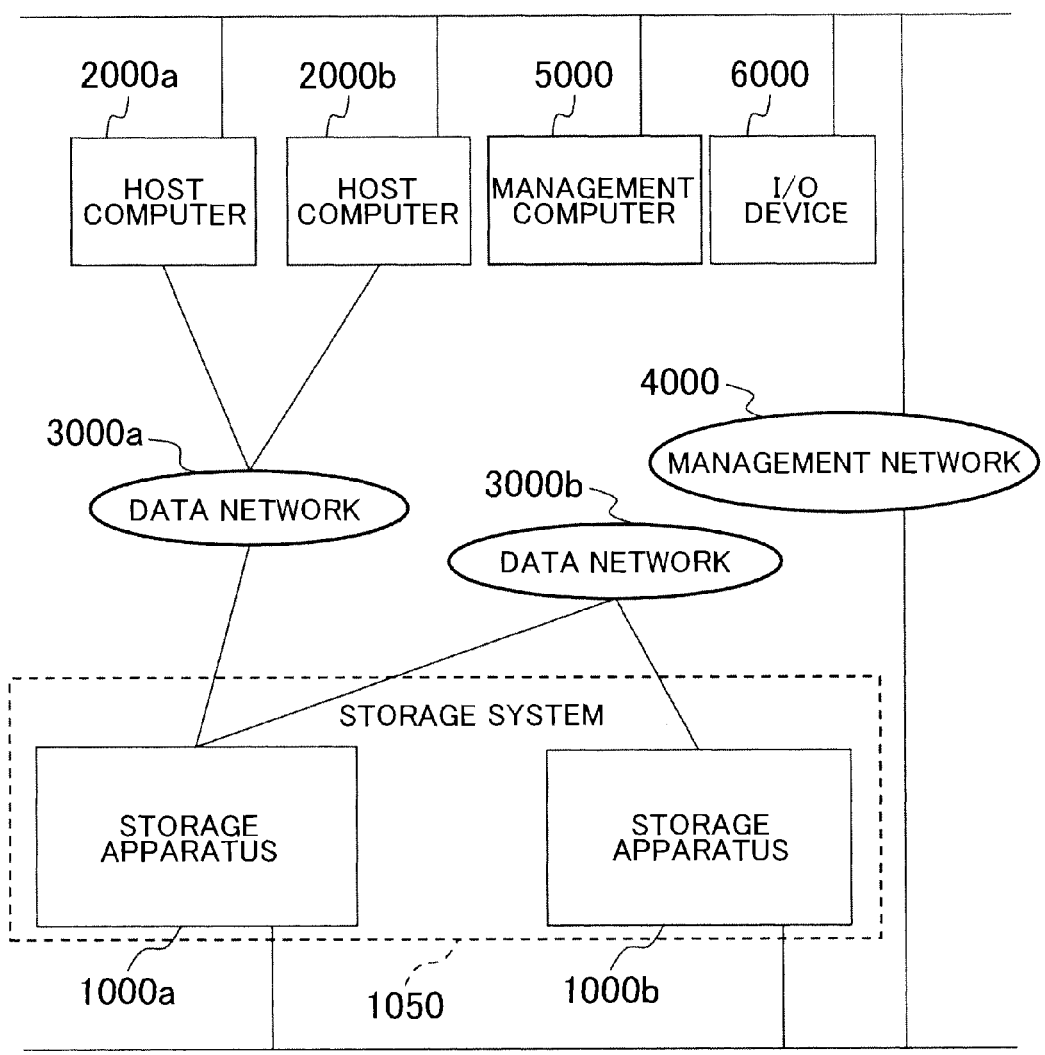
FIG. 1 is a block diagram showing the overall configuration of a computer system according to a first embodiment of the present invention.

First, the configuration of a computer system 1 according to this embodiment will be described by referring to FIG. 1. As shown in FIG. 1, the computer system 1 according to this embodiment comprises a storage system 1050, host computers 2000*a*, 2000*b* (hereinafter the host computers 2000*a*, 2000*b* will sometimes be referred to simply as the 'host computers 2000'), data networks 3000*a*, 3000*b* (hereinafter the data networks 3000*a*, 3000*b* will sometimes be referred to simply as the 'data networks 3000'), a management network 4000, a management computer 5000, and an I/O apparatus 6000.

The storage system 1050 is configured from a plurality of storage apparatuses, namely, for example, a storage apparatus 1000*a* and a storage apparatus 1000*b*. The storage apparatus 1000*a* and storage apparatus 1000*b* may also be referred to in the following description simply as the 'storage apparatuses 1000'. Furthermore, in order to clearly distinguish a storage apparatus connected to a certain storage apparatus from a connection-destination storage apparatus, the former may be referred to as the 'external connection-source storage apparatus, while the latter may be referred to as the 'external connection-destination storage apparatus.'

The plurality of storage apparatuses 1000 and host computers 2000 are connected via the data network 3000*a*. Furthermore, the plurality of storage apparatuses 1000 which the storage system 1050 comprises are interconnected via the data network 3000*b*. The data networks 3000*a* and 3000*b* may be SAN (Storage Area Networks), IP (Internet Protocol) networks, or may be data communication networks of a different kind.

Furthermore, the host computers 2000 and storage apparatuses 1000 are connected to the management computer 5000 via the management network 4000. The management network 4000 may take the form of an IP network, for example, but may also be a SAN or another data communication network. In addition, the data networks 3000*a*, 3000*b* and the management network 4000 may be different networks or the same network. Moreover, although the host computers 2000 and the management computer 5000 are illustrated in this embodiment as separate computers, the embodiment is not limited to separate computers, rather, the host computers 2000 and the management computer 5000 may instead be configured as a single computer. Furthermore, the I/O apparatus 6000 is connected via the management computer 5000 and the management network 4000.

The storage apparatus 1000 is an information processing apparatus which comprises a storage device storing data, parses commands which are transmitted from the host computer 2000, and executes reads/writes from and to the storage area of the storage apparatuses 1000. The host computer 2000 is a computer apparatus which executes various arithmetic processing corresponding to user tasks and is configured from a personal computer, a workstation or a mainframe or the like, for example.

The management computer 5000 is an information processing apparatus which the system administrator uses to manage the computer system 1 and is configured from a personal computer, a workstation, or a mainframe, or the like, for example. The I/O apparatus 6000 is a terminal device which accepts inputs from the system administrator and receives and outputs processing results and so forth transmitted from the management computer 5000 and is configured from input devices such as a keyboard, a switch, and a pointing device and output devices such as a display and a speaker, for example. In this embodiment, the management computer 5000 and the I/O apparatus 6000 are separate devices but the embodiment is not limited to this arrangement but the management computer 5000 and the I/O apparatus 6000 may also be configured as a single device.

Furthermore, in FIG. 1, the computer system 1 is configured from one storage system which is configured from two storage apparatuses 1000, two host computers 2000, and one management computer 5000, but the quantities of each of these devices are not restricted to these quantities.

An overview of this embodiment will be described here. Normally, if the amount of data handled by the computer system 1 increases, the increased data amount is handled by adding a new storage apparatus 1000 and migrating data between the existing storage systems 1050.

The data units migrated between the storage systems 1050 are storage-area units which are used by the host computers 2000 to store data in the storage apparatus 1000 and exemplified by logical volumes which are configured from a single hard disk drive (HDD), by logical volumes in a RAID group which is configured from a plurality of hard disk drives, or by virtual volumes which use Thin Provisioning, for example.

Here, Thin Provisioning is a function which provides virtual volumes to the host computers 2000 and which, when there is a request from a host computer 2000 to write data to a virtual volume, dynamically assigns a physical storage area for storing data to the virtual volume. A Thin Provisioning function of this kind makes it possible to provide the host computer 2000 with a virtual volume of a larger capacity than the storage area that is actually provided. In addition, most recently, storage management has been performed efficiently by using hard disk drives of a plurality of types of varying performance. For example, in a management procedure known as 'hierarchical storage management,' a storage area is assigned from a high-speed, high-performance storage tier to an area where data of a high access frequency is stored and a storage area is assigned from a low-speed, low-performance storage tier to an area where data of a low access frequency is stored.

Furthermore, a technology is disclosed which involves acquiring information on a migration-source storage area where migrated data is stored and information on a data migration-destination storage area, calculating the time required to migrate the data, and creating an optimal data migration plan. For example, priority can be given to migrating data of a high access frequency by prioritizing the migration of data which is stored in a high-performance storage tier over the migration of data stored in a low-performance storage tier.

However, with the foregoing technology, in order to calculate the time required for data migration, the management computer 5000 which manages a plurality of storage apparatuses 1000 must acquire all the information relating to an optional storage area from the storage apparatus 1000a which is the data migration source and the storage apparatus 1000b which is the data migration destination. For this reason, there is a problem in that the amount of data which is transferred between the management computer 5000 and the storage apparatuses 1000 is huge and the overall performance of the storage system will likely be degraded. In the storage system 1 according to this embodiment, the data migration processing and so on can be made efficient by drastically reducing information relating to the storage areas of the storage apparatuses 1000 and by obtaining the same results as in a case where all the information relating to the storage areas is obtained.

(1-2) Configuration of each Device
(1-2-1) Storage Apparatus Configuration

Figure 2:
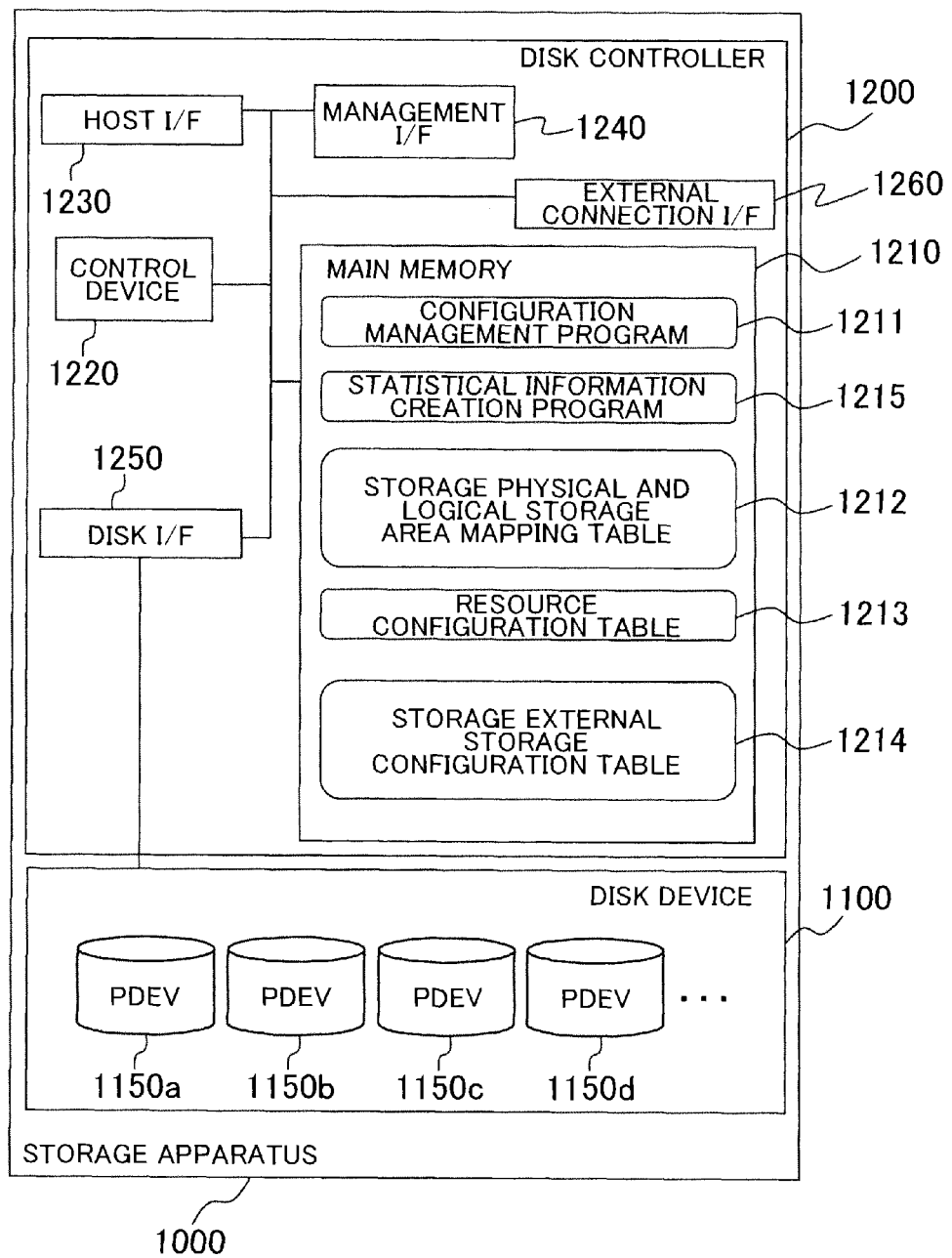
FIG. 2 is a block diagram showing the configuration of a storage apparatus according to the first embodiment.

The hardware configuration and the software configuration of the storage apparatuses 1000 will be described next. As shown in FIG. 2, the storage apparatuses 1000 are configured from a disk controller 1200 which controls the whole storage apparatuses 1000 and the disk device 1100 which stores data.

The disk controller 1200 comprises a main memory 1210, a control device 1220, a host I/F 1230, a management I/F 1240, a disk I/F 1250, and an external connection I/F 1260. Note that a storage apparatus 1000 need not comprise an external connection I/F if this storage apparatus 1000 is used as an external connection destination.

The main memory 1210 stores a configuration management program 1211, a statistical information creation program 1215, a storage physical and logical storage area mapping table 1212, a resource configuration table 1213, and a storage external storage configuration table 1214. Note that if the storage apparatuses 1000 are used as an external connection destination, the storage external storage configuration table 1214 need not be stored in the main memory 1210. Furthermore, if the storage apparatuses 1000 are not compatible with the Thin Provisioning function, the storage physical and logical storage area mapping table 1212 need not be stored in the main memory 1210. Details on each of the tables will be described subsequently.

The configuration management program 1211 is a program which manages configuration information and performance information on the storage apparatuses 1000. The configuration management program 1211 refers to and updates the information which is stored in the storage physical and logical storage area mapping table 1212, the resource configuration table 1213 or the storage external storage configuration table 1214, for example. In addition, the configuration management program 1211 transmits and receives various information by communicating with a system management program 5110 of the management computer 5000 (described subsequently).

The statistical information creation program 1215 comprises a function for creating statistical information relating to the configuration of the storage apparatuses 1000 in response to a request from the management computer 5000. Here, statistical information is information which corresponds to units of a predetermined storage area and the granularity of predetermined statistical information, the storage-area units being exemplified by logical volumes or virtual volumes and the granularity of predetermined statistical information being exemplified by the number of segments assigned for each resource and the data occupancy in the logical volumes and the like. The statistical information creation program 1215 acquires information which corresponds to the units of the storage areas and the granularity of the statistical information which are provided by the management computer 5000 from each of the tables. Each of the tables stored in the main memory 1210 will be subsequently described in detail.

The control device 1220 functions as an arithmetic processing device and controls the overall operation of the storage apparatuses 1000 according to various programs and computation parameters and so on which are stored in the main memory 1210.

The host I/F 1230 is an interface for connecting to the host computers 2000 via the data network 3000 and transmits and receives various information such as data and control commands to and from the host computers 2000. The management I/F 1240 is an interface for connecting to the host computers 2000 and the management computer 5000 via the management network 4000, and sends and receives the various information such as data and control commands to the host computers 2000 and the management computer 5000.

The disk I/F 1250 is an interface which connects the disk controller 1200 and the disk device 1100 and which sends and receives the various information such as data and control commands to and from the disk device 1100. The external connection I/F 1260 is an interface for connecting the data network 3000 and the externally connected storage apparatuses 1000 and sends and receives the various information such as data and control commands to and from the externally connected storage apparatus 1000.

The disk device 1100 is configured from a plurality of physical devices (PDEV) 1150a, 1150b, 1150c, and 1150d (which hereinafter may be described as 'physical devices (PDEV) 1150'). The logical configuration of the disk device 1100 will be described here.

Figure 3:
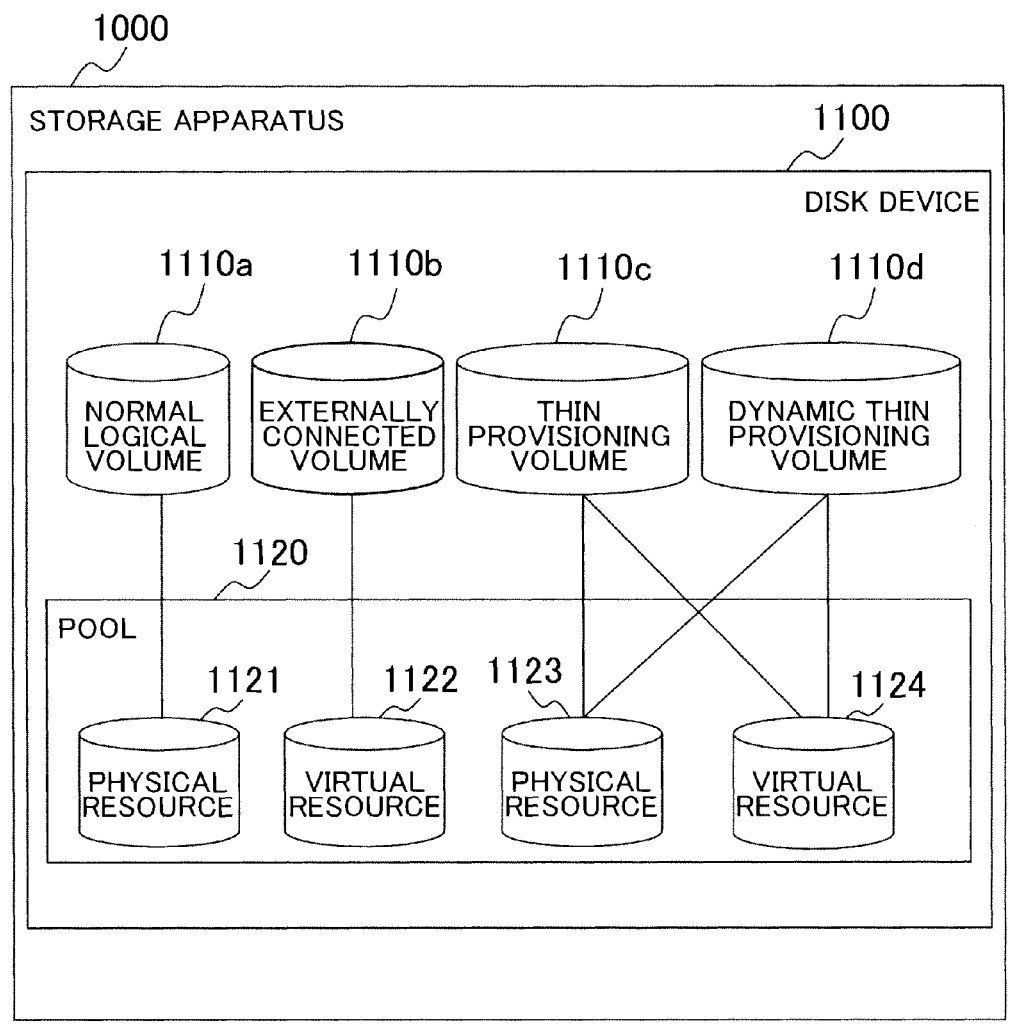
FIG. 3 is a block diagram showing the configuration of a disk device according to the first embodiment.

As shown in FIG. 3, the disk device 1100 comprises one or more logical volumes 1110 (1110a, 1110b, 1110c, 1110d) and a pool 1120. The logical volumes 1110 are logical storage areas which serve as data storage units and are generated from one or more physical resources 1121 or virtual resources 1122. The logical volumes 1110 store various data which is read/written by the host computers 2000. Note that, in this embodiment, the disk device 1100 is provided with four logical volumes 1110 and a single pool 1120 but the number of logical volumes and so on is not limited to this quantity.

The pool 1120 is configured from one or more physical resources 1121 or one or more virtual resources. The pool 1120 may be a set of storage areas which the storage apparatuses 1000 provide to the host computers 2000 and may, for example, be a pool which is provided by a RAID group or a pool that is provided by Thin Provisioning. For example, in the case of a pool provided by a RAID group, a single RAID group is configured from a plurality of disks and one or more logical volumes are defined in a storage area provided by the single RAID group. Furthermore, logical volumes which are provided by a plurality of RAID groups are managed as a single pool. RAID groups are exemplified by 'RAID0', which integrates a plurality of hard disk devices as one device and provides the device as an enormous storage area and by 'RAID1', which performs mirroring between hard disks in order to increase the redundancy of the hard disk devices, for example.

In FIG. 3, the pool 1120 is configured from a physical resource 1121 and a virtual resource 1122 but is not limited to these resources, rather, the pool 1120 may also be configured from the physical resource 1121 alone or may be configured from only the virtual resource 1122. In addition, in this embodiment, a logical device which is in a RAID configured from a plurality of physical devices (PDEV) 1150 is defined as a physical resource. Furthermore, a logical device which is created in the external connection-source storage system 1050 is defined, according to external connection technology, as a virtual resource. Moreover, absent the need to make a particular distinction between physical resources and virtual resources, these resources may be described simply as 'resources.'

Furthermore, various types of the logical volume 1110 are shown in FIG. 3. These types of logical volume 1110 are, for example, a normal logical volume 1110a, an externally connected volume 1110b, a Thin Provisioning volume 1110c, and a dynamic Thin Provisioning 1110d or the like.

The normal logical volume 1110a is a logical storage area which is configured from a physical resource 1121 (a RAID group or the like) which is constructed from hard disk devices. Further, the actual storage area of the externally connected volume 1110b exists in an external connection destination (the storage apparatus 1000b, for example) and is a logical storage area which is configured from a virtual resource 1122.

Furthermore, the Thin Provisioning volume 1110c is a logical volume which has a dynamically expanded capacity as mentioned earlier. The Thin Provisioning volume 1110c can have its volume capacity dynamically expanded by assigning a segment (predetermined area) from the physical resource 1123 or virtual resource 1124 which is contained in the pool 1120 at the point where a data write request from the host computer 2000 is received.

In addition, the dynamic Thin Provisioning volume 1110d is a logical volume which can have its capacity expanded dynamically in the same way as the Thin Provisioning volume 1110c. With the dynamic Thin Provisioning volume 1110d, once assigned, segments can be dynamically assigned to segments of a different performance (responsiveness, reliability and the like) depending on the logical volume access status.

Note that, in FIG. 3, the Thin Provisioning volume 1110d and the dynamic Thin Provisioning volume 1110c have segments assigned from both the physical resource 1123 and the virtual resource 1124 but the arrangement is not limited to this example, rather, segments may also be assigned from either one of the physical resource 1123 and the virtual resource 1124.

Details of each of the tables stored in the main memory 1210 will be provided next with reference to FIGS. 4 to 7.

The storage physical and logical storage area mapping table 1212 is a table which manages correspondence relationships between logical addresses of the logical volumes 1110 and the addresses of the physical resources 1121 or virtual resources 1122 in the Thin Provisioning function. The storage physical and logical storage area mapping table 1212 is, as shown in FIG. 4, configured from a volume identifier field 12120, a logical start address field 12121, a logical end address field 12122, a pool identifier field 12123, a resource identifier field 12124, a physical start address field 12125, and a physical end address field 12126.

The volume identifier field 12120 stores a volume identifier which identifies each of the logical volumes 1110. Furthermore, the logical start address field 12121 stores the start addresses of the segments of the logical volumes 1110 and the logical end address field 12122 stores the end addresses of the logical volumes 1110 which correspond to the logical start addresses stored in the logical start address field 12121.

Furthermore, the pool identifier field 12123 stores pool identifiers identifying pools which have a resource which is a segment assignment source. The resource identifier field 12124 stores resource identifiers which are identifiers of the physical resources 1121 or virtual resources 1122 of the pool 1120. The physical start address field 12125 stores the resource start addresses of the physical resources 1120 or the virtual resources 1122 of the pool 1120, and the physical end address field 12126 stores the resource end addresses of the physical resources 1120 or the virtual resources 1122 of the pool 1120.

Here, the information stored in the storage physical and logical storage area mapping table 1212 will be described.

Figure 5:
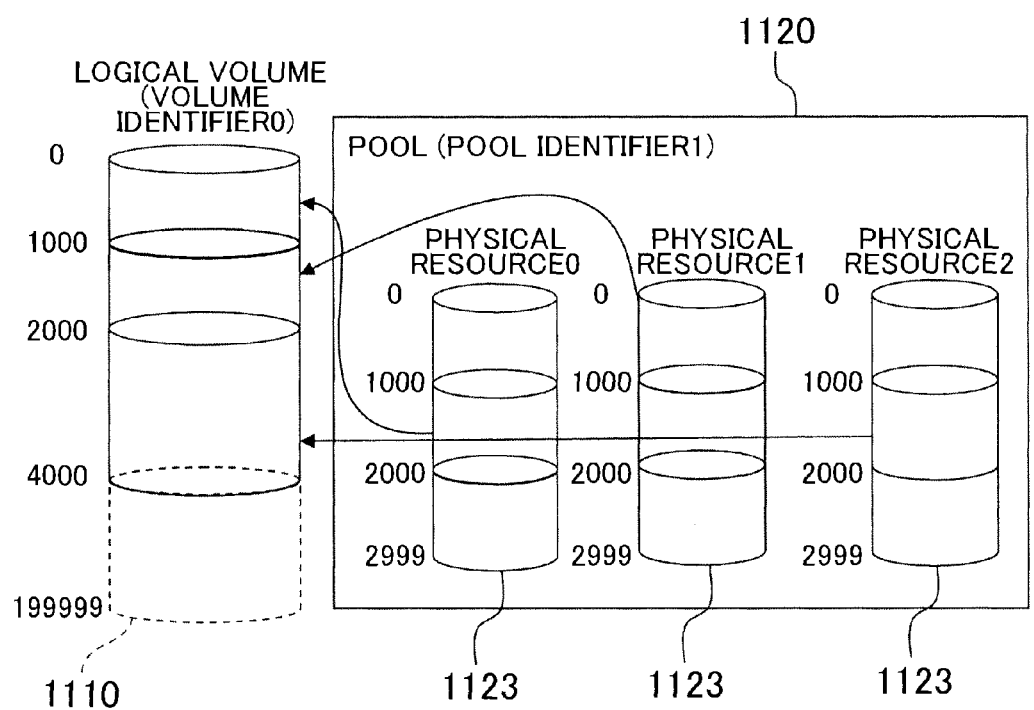
FIG. 5 is a conceptual diagram showing an example of information which is stored in the storage physical and logical storage area mapping table according to the first embodiment.

FIG. 5 shows an example of information which is stored in the storage physical and logical storage area mapping table 1212 shown in FIG. 4. As shown in FIG. 5, numbers 1000 to 1999 of the physical resource in the pool 1120 with the pool identifier '1' correspond to numbers 0 to 999 of the logical volume 1110 (volume identifier is '0'). Likewise, numbers 0 to 999 of physical resource '1' correspond to the numbers 1000 to 1999 of the logical volume (volume identifier is '0') 1110. Furthermore, numbers 0 to 2999 of physical resource '2' correspond to the numbers 2000 to 3999 of the logical volume (volume identifier is '0') 1110. In addition, numbers 4000 to 199999 of the logical volume 1110 are in a state of having no physical resource assigned thereto. Note that the correspondence relationship shown in FIG. 5 is dynamically changed by the dynamic Thin Provisioning volume 1110d.

The resource configuration table 1213 will be described next. The resource configuration table 1213 is a table which manages information relating to resources which are provided in the disk devices 1110 of the storage apparatuses 1000. As shown in FIG. 6, the resource configuration table 1213 is configured from a pool identifier field 12130, a resource identifier field 12131, a resource type field 12132, and a resource configuration field 12133.

The pool identifier field 12130 stores pool identifiers identifying pools to which each resource belongs. The resource identifier field 12131 stores resource identifiers identifying each of the resources. The resource type field 12132 stores information indicating the type of each resource. The resource type denotes the type of storage medium, examples of which are FC (Fibre Channel), SSD (Solid State Drive) and SATA (Serial AT Attachment), and the like. The resource configuration field 12133 stores information indicating the configuration of resources. Information indicating the resource configuration is information indicating physical resources in the storage apparatuses 1000 or virtual resources of an external storage apparatus connected to the storage apparatuses 1000. In FIG. 6, physical resources in the storage apparatuses 1000 are 'internal' and virtual resources outside the storage apparatus are 'external.'

The storage external storage configuration table 1214 will be described next. The storage external storage configuration table 1214 is a table for managing the correspondence relationship between the virtual resource 1122 in the storage apparatus 1000a (hereinafter described as the 'externally connected source storage apparatus 1000a') which is an externally connected connection source, and the logical volume of the storage apparatus 1000b (hereinafter called the 'external connection destination storage apparatus 1000b') which is an externally connected connection destination. As shown in FIG. 7, the storage external storage configuration table 1214 is configured from a resource identifier field 12140, a port identifier field 12141, an external storage identifier field 12142, an external storage resource identifier field 12143 and an external storage port identifier field 12144.

The resource identifier field 12140 stores resource identifiers identifying the virtual resources 1122 of the external connection source storage apparatus 1000a. The port identifier field 12141 stores port identifiers which identify ports, of the external connection source storage apparatus 1000a, which connect virtual resources 1122 of the external connection source storage apparatus 1000 and the logical volumes 1110 of the external connection destination storage apparatus 1000b.

The external storage identifier field 12142 stores identifiers which identify the external connection destination storage apparatus 1000b which corresponds to the virtual resources 1122 of the external connection source storage apparatus 1000a. The identifiers may be information in any format as long as these identifiers are information which makes it possible to specify the external connection destination storage apparatus 1000b.

The external storage resource identifier field 12143 stores identifiers which identify resources constituting the logical volumes 1110 of the external connection destination storage apparatus 1000b which correspond to the virtual resources 1122 of the external connection source storage apparatus 1000a. In addition, the external storage port identifier field 12144 stores port identifiers which identify ports, of the external connection source storage apparatus 1000a, which connect the virtual resources 1122 of the external connection source storage apparatus 1000a and the logical volume 1110 of the external connection destination storage apparatus 1000b.

(1-2-2) Configuration of Host Computer

Figure 8:
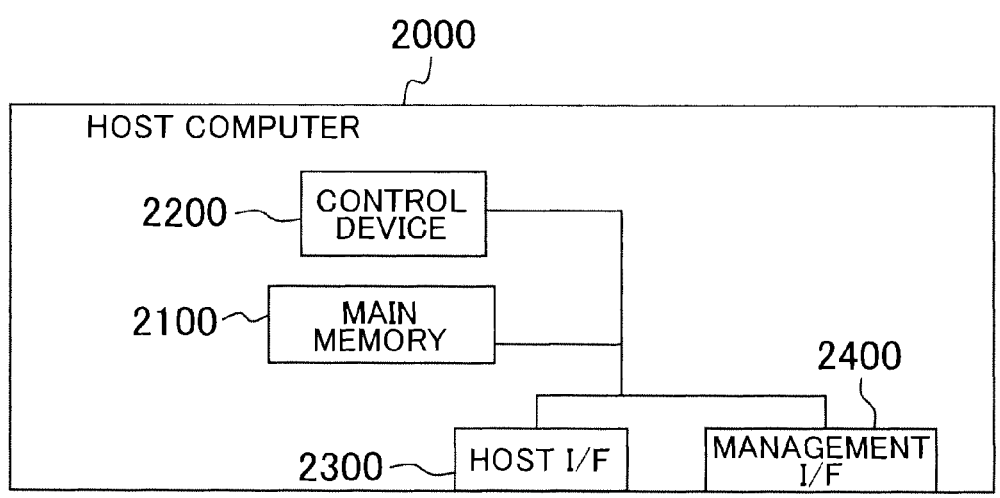
FIG. 8 is a block diagram showing the configuration of a host computer according to the first embodiment.

The hardware configuration and software configuration of the host computer 2000 will be described next with reference to FIG. 8. As shown in FIG. 8, the host computer 2000 comprises a main memory 2100, a control device 2200, a host I/F 2300, and a management I/F 2400. Note that the host computer 2000 may also be provided with I/O devices, not shown, such as a keyboard and display device and the like.

The main memory 2100 stores various programs and computation parameters and so on. The control device 2200 functions as an arithmetic processing device and controls the whole operation of the host computer 2000 according to various programs and computation parameters and the like stored in the main memory 2100.

The host I/F 2300 is an interface for connecting to the storage apparatuses 1000 via the data network 3000 and sends and receives various information such as data and control commands to the storage apparatus 1000. The management I/F 2400 is an interface for connecting to the storage apparatus 1000 or management computer 5000 via the management network 4000 and sends and receives various information such as data and control commands to and from the storage apparatuses 1000 or the management computer 5000.

(1-2-3) Management Computer Configuration

Figure 9:
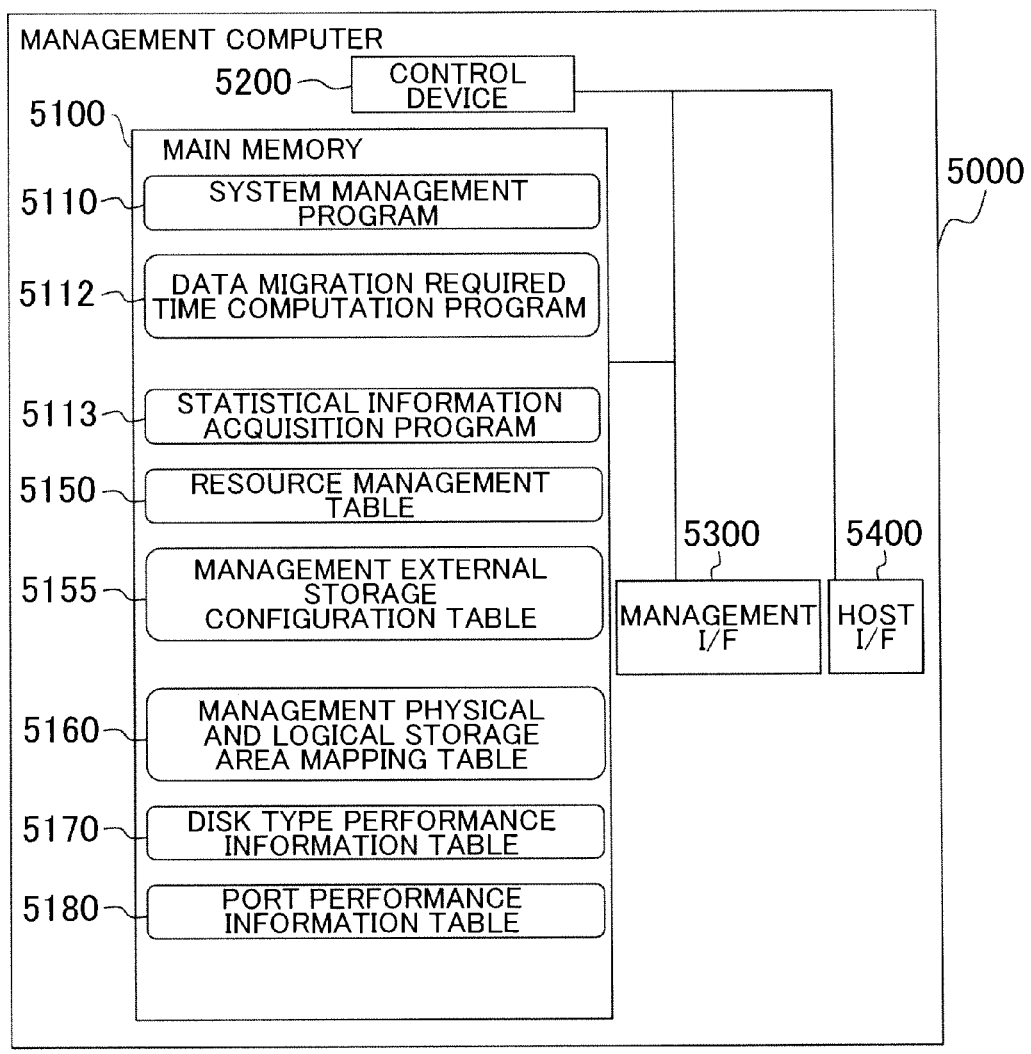
FIG. 9 is a block diagram showing the configuration of a management computer according to the first embodiment.

The hardware configuration and software configuration of the management computer 5000 will be described next with reference to FIG. 9. As shown in FIG. 9, the management computer 5000 comprises a main memory 5100, a control device 5200, a management I/F 5300, and a host I/F 5400.

The main memory 5100 stores the system management program 5110, a data migration required time computation program 5112, a statistical information acquisition program 5113, a resource management table 5150, a management external storage configuration table 5155, a management physical and logical storage area mapping table 5160, a disk type performance information table 5170, and a port performance information table 5180.

The system management program 5110 is a program which manages the configuration of the storage system 1050 and which, more specifically, acquires the configuration information of the storage apparatuses 1000 from the configuration management program 1211 of the storage apparatuses 1000 and updates the resource management table 5150 and the management external storage configuration table 5155 based on the acquired information.

The data migration required time computation program 5112 is a program for accepting inputs of information on the migration target volume and migration destination volume in response to a user operation, and refers to the resource management table 5150, the management external storage configuration table 5155, the management physical and logical storage area mapping table 5160, the disk type performance information table 5170 and the port performance information table 5180 and calculates the input time required for data migration between the volumes.

The statistical information acquisition program 5113 accepts, in response to a user operation and as targets for acquiring statistical information, inputs of optional storage area units and of statistical information granularity and provides information which is input to the statistical information creation program 1215 of the storage apparatuses 1000. The statistical information acquisition program 5113 acquires statistical information which corresponds to the input from the statistical information creation program 1215 of the storage apparatuses 1000.

The resource management table 5150 will be described next. The resource management table 5150 is a table which manages information on the resources of one or more storage apparatuses 1000 which are managed by the management computer 5000. As shown in FIG. 10, the resource management table 5150 is configured from an apparatus identifier field 51500, a pool identifier field 51501, a resource identifier field 51502, a resource type field 51503, and a resource configuration field 51504.

The apparatus identifier field 51500 stores storage-apparatus identifiers which identify the storage apparatuses 1000. The pool identifier field 51501 stores pool identifiers identifying the pools 1120 of the storage apparatus 1000. The resource identifier field 51502 stores resource identifiers which identify the resources in each of the pools. The resource type field 51503 stores information indicating the types of each resource. Resource type denotes the type of storage media, examples of which include FC, SSD, and SATA and so on. The resource configuration field 51504 stores information indicating the resource configuration. Information indicating the resource configuration is information which indicates the physical resource in the storage apparatus 1000 or the virtual resource of an external storage apparatus connected to the storage apparatus 1000. In FIG. 10, the physical resources in the storage apparatuses 1000 are denoted 'internal' and the virtual resources outside the storage apparatuses are denoted 'external.'

The management external storage configuration table 5155 will be described next. The management external storage configuration table 5155 is a table which is managed by the management computer 5000 and shows the external connection configuration between one or more storage apparatuses 1000a and the externally connected external storage apparatus 1000b. The management external storage configuration table 5155 is, as shown in FIG. 11, configured from a storage identifier field 51550, a resource identifier field 51551, a port identifier field 51552, an external storage identifier field 51553, an external storage resource identifier 51554, and an external storage port identifier field 51555.

The storage identifier field 51550 stores storage identifiers identifying the external connection source storage apparatus 1000a. The resource identifier field 51551 stores resource identifiers identifying virtual resources 1122 in the external connection source storage apparatus 1000a. The port identifier field 51552 stores port identifiers identifying ports, of the external connection source storage apparatus 1000a, which connect the virtual resources 1122 in the external connection source storage apparatus 1000a to the logical volumes 1110 in the external connection destination storage apparatus 1000b.

The external storage identifier field 51553 stores external storage identifiers which identify the external connection destination storage apparatus 1000b corresponding to the virtual resources 1122 in the external connection source storage apparatus 1000a. The external storage resource identifier 51554 stores external storage resource identifiers which identify resources constituting the logical volumes in the external connection destination storage apparatus 1000b corresponding to the virtual resources 1122 in the external connection source storage apparatus 1000a. The external storage port identifier field 51555 stores external storage port identifiers which identify ports, of the external connection source storage apparatus 1000b, which connect the virtual resources 1122 in the external connection source storage apparatus 1000a to the logical volumes 1110 in the external connection destination storage apparatus 1000b.

The management physical and logical storage area mapping table 5160 will be described next. The management physical and logical storage area mapping table 5160 is a table which manages optional statistical information relating to the configuration of the storage apparatus 1000. More specifically, the statistical information acquisition program 5113 acquires, from the storage apparatus 1000, optional statistical information based on the information in the storage physical and logical storage area mapping table 1212 of the storage apparatuses 1000 and stores this information in the management physical and logical storage area mapping table 5160. The statistical information is, for example, information corresponding to predetermined storage area units and the granularity of predetermined statistical information, where examples of storage area units include logical volumes and virtual volumes and examples of statistical information granularity include the number of segments of each resource which are assigned and data occupancy in the logical volumes. In FIG. 12, an example is illustrated in which numbers of segments of resources assigned to the virtual volume are stored as statistical information.

The management physical and logical storage area mapping table 5160 is, as shown in FIG. 12, configured from an apparatus identifier field 51600, a volume identifier field 51601, a pool identifier field 51602, a resource identifier field 51603, and an assigned segment count 51604. The apparatus identifier field 51600 stores apparatus identifiers identifying storage apparatuses 1000. The volume identifier field 51601 stores volume identifiers identifying the logical volumes 1110. The pool identifier field 51602 stores pool identifiers identifying pools with resources which are segment assignment sources. The resource identifier field 51603 stores resource identifiers which are identifiers of the physical resources 1121 or virtual resources 1122 of the pool 1120.

The assigned segment count 51604 stores the number of segments of the optional resources assigned to each volume. For example, among the information stored in the storage physical and logical storage area mapping table 1212, a value obtained by totaling the numbers of segments assigned from resources of the same type is stored.

The disk type performance information table 5170 will be described next. The disk type performance information table 5170 is a table which manages the read/write performance of each resource of the physical resources 1121 or the virtual resources 1122. The disk type performance information table 5170 is, as shown in FIG. 13, configured from an apparatus identifier field 51700, a resource identifier field 51701, a read performance field 51702 and a write performance field 51703.

The apparatus identifier field 51700 stores apparatus identifiers identifying the storage apparatuses 1000. The resource type field 51701 stores information indicating the types of each resource. The resource type denotes the types of storage media, examples of which are FC, SSD, and SATA, and the like. The read performance field 51702 stores the read performance corresponding to the resource types. The read performance is indicated in 'G/sec' units, for example, but the embodiment is not limited to this example and may be expressed using different units. The write performance field 51703 stores the write performance corresponding to the resource type. For example, the write performance is indicated using 'G/sec' but the embodiment is not limited to this example and may be expressed using different units.

The port performance information table 5180 will be described next. The port performance information table 5180 is a table for managing IOPS (Input Output Per Second), which indicates the performance of each port contained in the storage apparatus 1000. The port performance information table 5180 is, as shown in FIG. 14, configured from an apparatus identifier field 51800, the port identifier field 51801 and the maximum IOPS field 51802.

The apparatus identifier field 51800 stores apparatus identifiers identifying the storage apparatuses 1000. The port identifier field 51801 stores port identifiers identifying each of the ports contained in the storage apparatuses 1000. The maximum IOPS field 51802 stores the IOPS values of each of the ports. IOPS values of ports contained in catalogues and manuals and the like may be stored as the IOPS values. Furthermore, measurement values of the IOPS of the ports acquired from the storage apparatuses 1000 may be stored by the system management program 5110 and or predicted values obtained by assigning a trend derived from a plurality of previously measured measurement values may be stored by the system management program 5110.

Returning to FIG. 9, a control device 5200 functions as a arithmetic processing device and controls the operation of the whole management computer 5000 according to the various programs and computation parameters which are stored in the main memory 5100.

The management I/F 5300 is an interface for connecting to the storage apparatuses 1000 and the host computers 2000 via the management network 4000 and for sending and receiving various information such as data and control commands to the storage apparatuses 1000 and host computers 2000.

The host I/F 5400 is an interface for connecting to the host computers 2000 via the management network 4000 and sends and receives various information such as data and control commands to the host computers 2000.

Note that each of the functions provided in the foregoing storage apparatuses 1000, the host computers 2000 and the management computer 5000 are implemented by each of the programs which are read from the main memory of each of the apparatuses and executed by the control devices of each apparatus. The programs may each be pre-stored in the main memory of each of the apparatuses and may, if necessary, be stored in the main memory from other devices via media which are available to each of the apparatuses. The media available to each of the apparatuses may, for example, be storage media which is detachably mounted in a reading apparatus or the like, a network connected to each apparatus, or a communication medium such as a carrier wave or digital signal or the like which is propagated over the network.

(1-3) Details of the Operation of each Apparatus

Details of the operation of each apparatus in the computer system 1 will be provided next. In particular, the operation of the management computer 5000 which executes the processing pertaining to the embodiment will be described in detail below.

Although the subject of the following description is sometimes 'programs,' the processing which is determined as a result of the programs being executed by the control device is performed while using the main memory and ports (communication control devices) and hence the subject of the description may also be the control device. Furthermore, the processing which is disclosed by taking the program as the subject may also be processing which is performed by a computer or information processing device such as a management computer. In addition, one or all of the programs may also be implemented by dedicated hardware. Furthermore, various programs may be installed on each computer by storage media (computer-readable memory media) which can be read by a program distribution server or a computer.

First, the processing of the system management program 5110 will be described in detail. The system management program 5110 may execute the following processing at regular intervals or may execute this processing in response to a user operation. The system management program 5110 performs processing to acquire configuration information from the storage apparatuses 1000 and store the configuration information thus acquired in a predetermined table.

Figure 15:
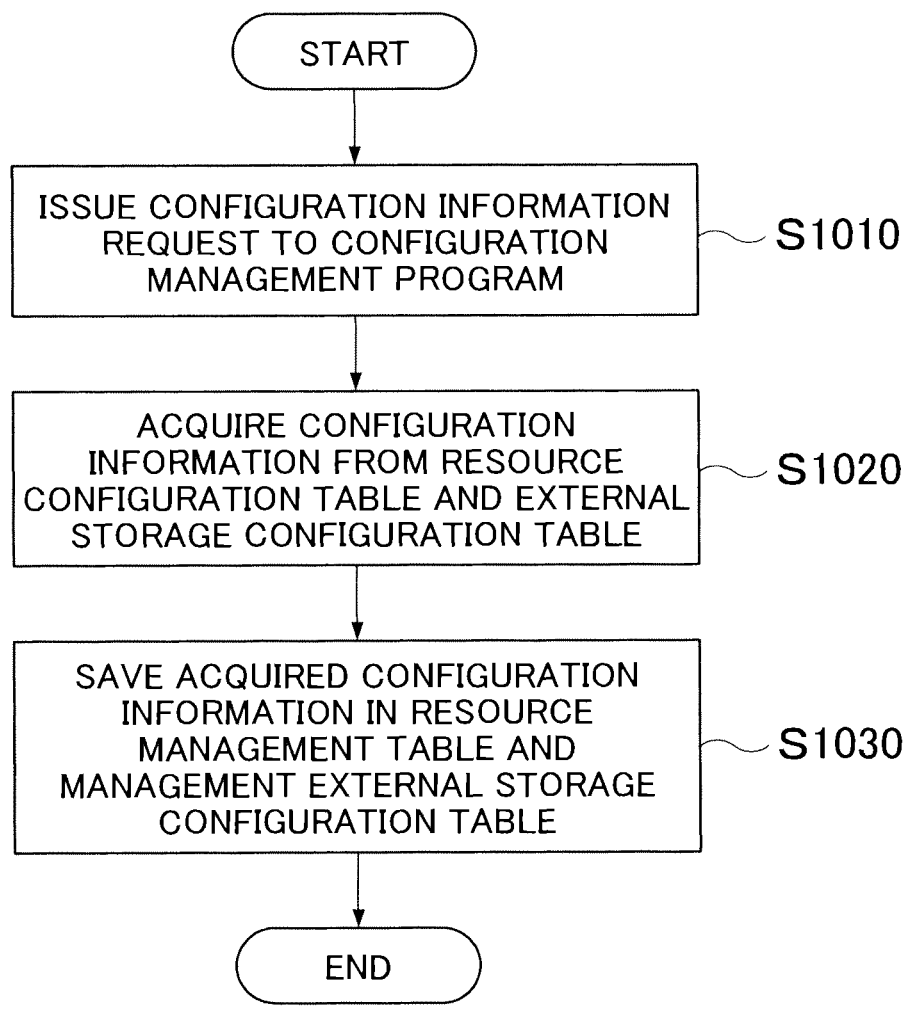
FIG. 15 is a flowchart showing a processing routine for processing of a system management program according to the first embodiment.

More specifically, as shown in FIG. 15, the system management program 5110 requests configuration information on resources in the storage apparatuses 1000 and external storage from the configuration management program 1211 of the storage apparatuses 1000 (S1010).

Furthermore, the system management program 5110 acquires information in the resource configuration table 1213 and the storage external storage configuration table 1214 in the storage apparatuses 1000 acquired by the configuration management program 1211 (S1020).

Further, the system management program 5110 stores the configuration information acquired in step S1020 in the resource management table 5150 and the management external storage configuration table 5155 (S1030). More specifically, the system management program 5110 associates the apparatus identifiers and resource configuration information of each storage apparatus 1000 and stores the identifiers and information in the resource management table 5150. Furthermore, the system management program 5110 associates the apparatus identifiers (storage identifiers) of each storage apparatus 1000 with the external storage configuration information thereof and stores the identifiers and information in the management external storage configuration table 5155.

The processing of the data migration required time computation program 5112 will be described in detail next. The data migration required time computation program 5112 may execute the following processing in response to an input from the system administrator or may execute the following processing in response to a request from a monitoring program (not shown) for monitoring the state of assignment of resources to logical volumes of the storage apparatuses 1000.

Figure 16:
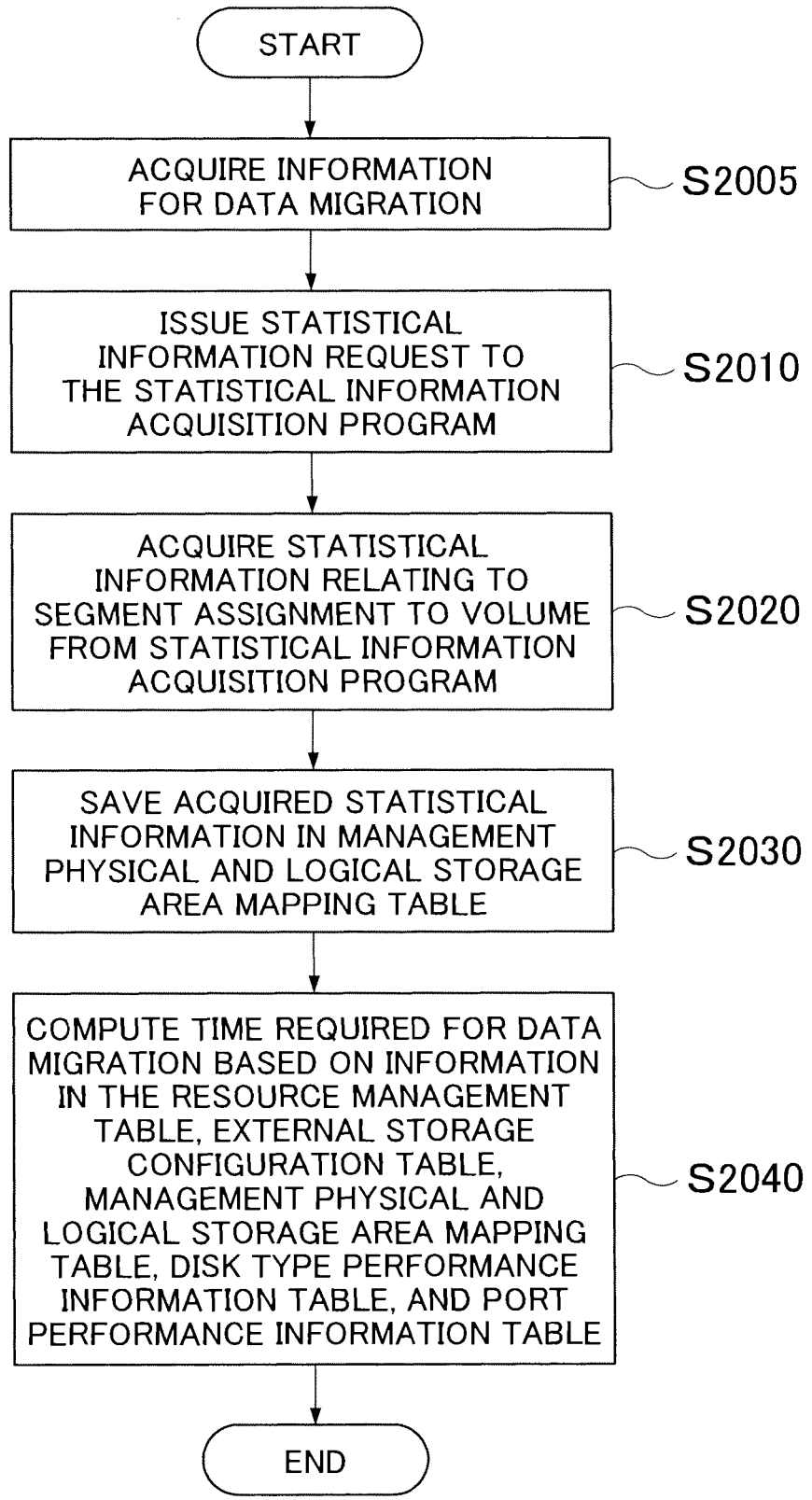
FIG. 16 is a flowchart showing a processing routine of a data migration required time computation program according to the first embodiment.

As shown in FIG. 16, the data migration required time computation program 5112 performs processing to calculate the time required for data migration in response to an input from the system administrator. More specifically, the data migration required time computation program 5112 first acquires information for data migration which is input by the system administrator via the I/O apparatus 6000 (S2005). The information for data migration is information on the volumes (logical volumes) serving as data migration targets and information on data migration-destination volumes, for example. The volume information is information identifying the resources indicated in FIG. 10 or FIG. 11, and so on, for example.

Further, the data migration required time computation program 5112 issues a request for statistical information corresponding to a predetermined input to the statistical information acquisition program 5113 (S2010). More specifically, the data migration required time computation program 5112 provides information on the migration-source volume and information on the migration-destination volume acquired in step S2005, the statistical information units, and the granularity and type of the statistical information to the statistical information acquisition program 5113 and acquires statistical information which corresponds to inputs from the statistical information acquisition program 5113. Here, the statistical information units can, for example, be virtual volume units, and the statistical information granularity and type can, for example, be the number of assigned segments of each resource.

Furthermore, the data migration required time computation program 5112 acquires statistical information relating to resource assignment of designated volumes acquired in step (S2010). Note that, in this embodiment, the acquired statistical information is information relating to the assignment of volume resources but is not limited to this example, rather, this is information which changes according to the inputs in step S2010. The processing to acquire the statistical information by the statistical information acquisition program 5113 will be described in detail subsequently.

The data migration required time computation program 5112 then stores the statistical information acquired in step S2020 in the management physical and logical storage area mapping table 5160 (S2030). As mentioned earlier, the management physical and logical storage area mapping table 5160 stores, among the information stored in the storage physical and logical storage area mapping table 1212, a value obtained by totaling the numbers of segments assigned from resources of the same type. It is thus possible to collectively acquire less information than all the information stored in the storage physical and logical storage area mapping table 1212 and therefore the amount of data transferred and the transfer time can be greatly reduced.

Furthermore, the data migration required time computation program 5112 calculates the time required for data migration based on information which is stored in the resource management table 5150, the management external storage configuration table 5155, the management physical and logical storage area mapping table 5160, the disk type performance information table 5170, and the port performance information table 5180 (S2040).

Figure 17:
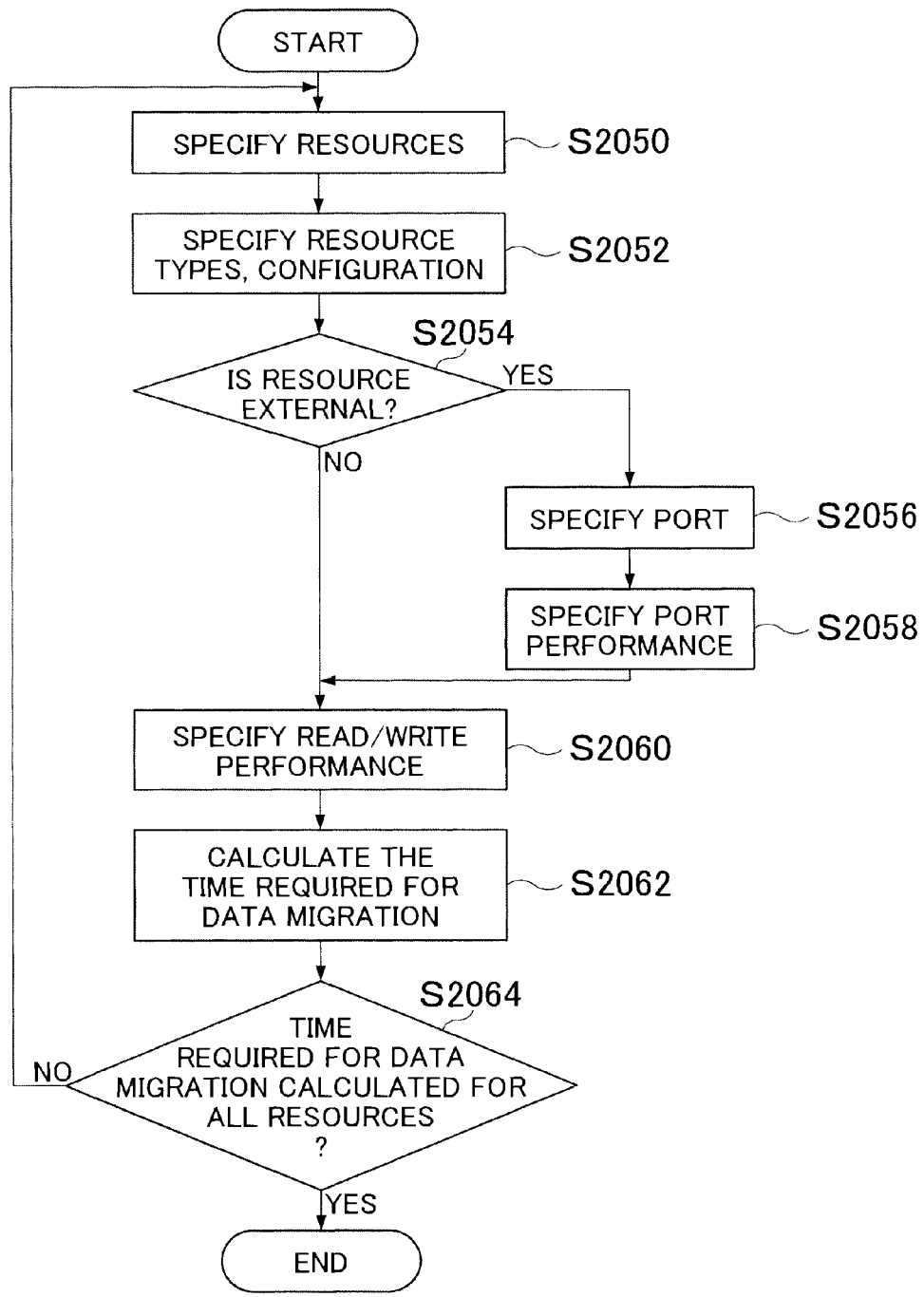
FIG. 17 is a flowchart showing a specific example of the data migration required time calculation processing according to the first embodiment.

Here, a specific example of data migration required time calculation processing will be described. As shown in FIG. 17, the data migration required time computation program 5112 refers to the management physical and logical storage area mapping table 5160 and specifies resources constituting the volume which is the data migration target that was input in step S2005 (S2050).

The data migration required time computation program 5112 then refers to the resource management table 5150 and specifies the type and configuration of the resources specified in step S2050 (S2052).

Furthermore, the data migration required time computation program 5112 determines whether or not the configuration information specified in step S2052 is external (S2054). If it is determined in step S2054 that the configuration information is external, the data migration required time computation program 5112 refers to the management external storage configuration table 5155 and specifies the port which is used for the external connection and corresponding to the specified resource (S2056). In addition, the data migration required time computation program 5112 refers to the port performance information table 5180 and specifies the performance information of the port specified in step S2056 (S2058).

If it is determined in step S2054 that the configuration information is not external, the data migration required time computation program 5112 executes the processing of step S2060. The data migration required time computation program 5112 then refers to the disk type performance information table 5170 and specifies the read/write performance corresponding to the type of resource specified in step S2050 (S2060).

The data migration required time computation program 5112 then calculates the data migration required time of the data stored in the resources specified in step S2050 (S2062). For example, if the migration source volume is a 200 GB SSD and a 800 GB FC, the SSD read performance is specified as 10 (G/sec) and the FC read performance is specified as 8 (G/sec) in step S2060. The time required for data migration of the migration-source volume is therefore calculated by the following equation.

[Math 1]

$$200/10+800/8=120 \text{ (sec)} \quad (1)$$

If the migration-destination volume is configured by a virtual resource in a 1000GB FC, the port performance is specified in step S2058. If the port performance maximum IOPS is 10 (G/sec), the port performance may also be 10/5 (G/sec). In addition, the FC write performance is specified as being 4 (G/sec) in step S2060. Hence, the time required for data migration to the migration-destination volume is therefore 1000/4+1000/5=250+200=450 (sec). The data migration required time computation program 5112 accordingly makes the data migration required time equal to a value (120+450=570 (sec)) which is obtained by adding the data migration required time of the migration-source volume to the data migration required time of the migration-destination volume.

The data migration required time computation program 5112 then determines whether or not to calculate the data migration required time for all the resources (S2064) and, if it is determined in step S2064 that the data migration required time has been calculated for all the resources, the data migration required time computation program 5112 terminates the processing. If, however, it is determined in step S2064 that that the data migration required time has not been calculated for all the resources, the data migration required time computation program 5112 repeats the processing of step S2050 and subsequent steps.

Details of the processing of the statistical information acquisition program 5113 will be described next. The statistical information acquisition program 5113 issues a request for predetermined statistical information to the statistical information creation program 1215 of the storage apparatuses 1000. The statistical information acquisition program 5113 executes the following statistical information acquisition processing based on the aforementioned instruction from the data migration required time computation program 5112.

Figure 18:
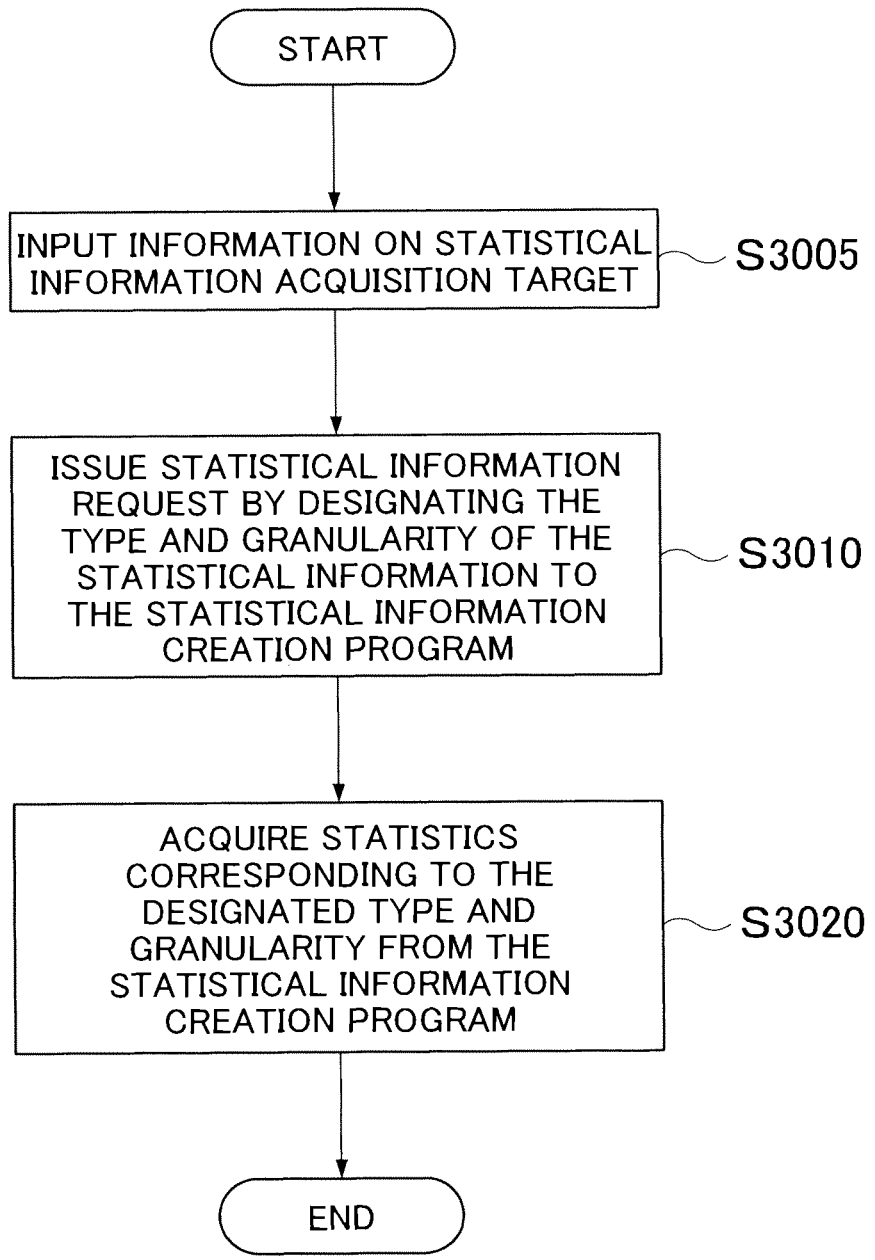
FIG. 18 is a flowchart showing a processing routine for processing of a statistical information acquisition program according to the first embodiment.

As shown in FIG. 18, the statistical information acquisition program 5113 first accepts an input of information on the statistical information acquisition target from the data migration required time computation program 5112 (S3005). The statistical information acquisition target information is, for example, the units of the statistical information acquisition target, information specifying the statistical information acquisition target, and the granularity or type of statistical information. More specifically, an example of a statistical information acquisition target unit is a virtual volume, an example of the information specifying the statistical information acquisition target is a migration-source or migration-destination logical volume, and an example of information on the granularity or type of statistical information is the segment assignment count for each resource.

Furthermore, the statistical information acquisition program 5113 provides the information on the statistical information acquisition target which was accepted in step S3005 to the statistical information creation program 1215 of the storage apparatus 1000 and issues a request for statistical information to the statistical information creation program 1215 (S3010).

Furthermore, the statistical information acquisition program 5113 acquires statistical information corresponding to the information on the statistical information acquisition target from the statistical information creation program 1215 (S3020). More specifically, the statistical information creation program 1215 creates, as statistical information, a value obtained by adding the number of segments assigned to the virtual volume to each of the resources, for the targeted virtual volume among the migration-source or migration-destination logical volumes, for example, and provides this value to the statistical information acquisition program 5113.

Note that, in step S3010, the statistical information acquisition program 5113 may also transmit the acquired time to the statistical information creation program. In this case, the statistical information acquisition program 5113 may also acquire statistical information only at points where the configuration has changed since the previous time of acquisition within the range of the statistical information acquired from the statistical information creation program in step S3020. Using this method, the amount of data transferred between the management computer 5000 and the storage apparatuses 1000 can be further reduced.

(2) Second Embodiment

The second embodiment of the present invention will be described next with reference to FIGS. 19 to 22. According to the first embodiment, an example of the statistical information which is transferred from the storage apparatuses 1000 to the management computer 5000 is data relating to the segment assignment information constituting the virtual volume; however, according to the second embodiment, in addition to the segment assignment information, the segment IOPS information and the information on assigning the segments of the resources in the pool differ from those of the first embodiment in that the segment IOPS information is transferred. A configuration which differs from that of the first embodiment is described in detail hereinbelow, and a detailed description of the same configuration as that of the first embodiment is not included.

Figure 19:
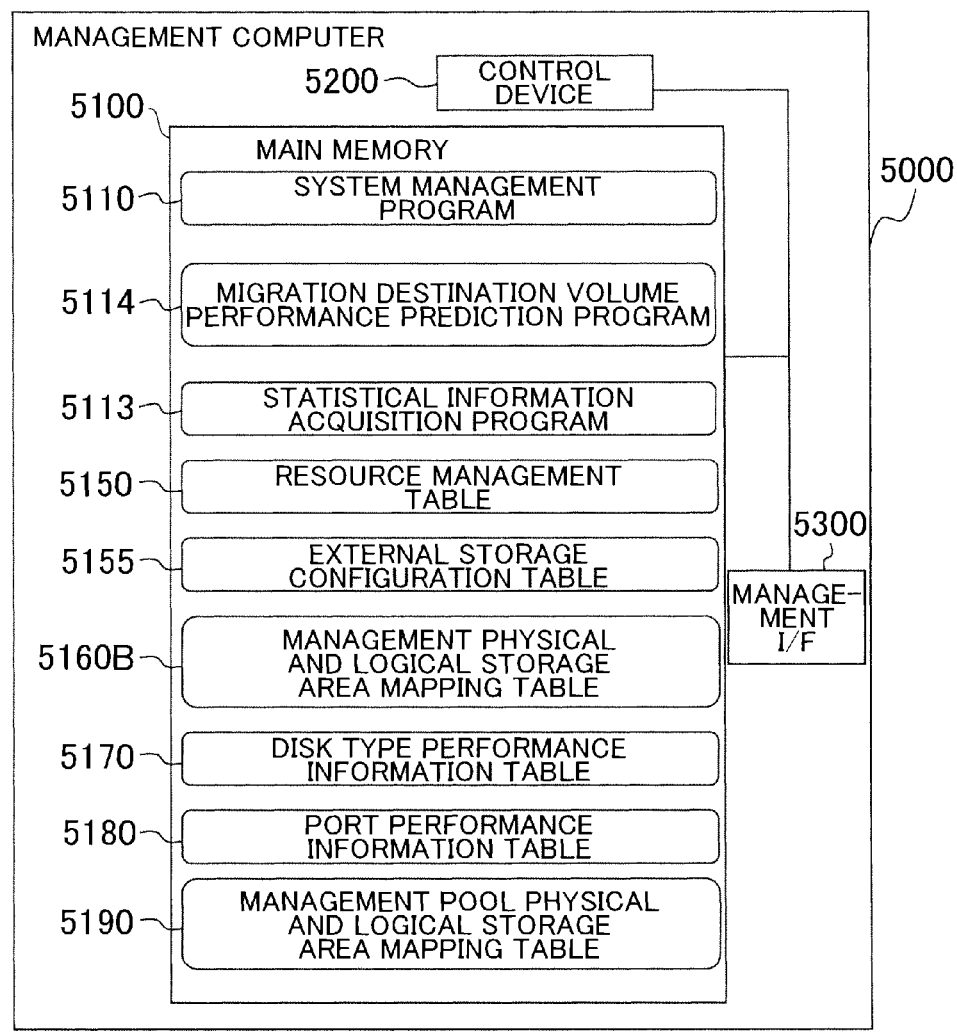
FIG. 19 is a block diagram showing the configuration of a management computer according to a second embodiment of the present invention.

As shown in FIG. 19, the management computer 5000 according to this embodiment is configured from the main memory 5100, the control device 2200, the management I/F 5300, and the host I/F 5400.

The control device 2200, the management I/F 5300, and the host I/F 5400 have the same functions as those of the first embodiment and a detailed description thereof is not included.

The main memory 5100 stores the system management program 5110, a migration-destination volume performance prediction program 5114, the statistical information acquisition program 5113, the resource management table 5150, the management external storage configuration table 5155, a management physical and logical storage area mapping table 5160B, the disk type performance information table 5170, the port performance information table 5180, and a management pool physical and logical storage area mapping table 5190. In this embodiment, the data migration required time computation program 5112 described in the first embodiment is not stored in the main memory 5100 but the data migration required time computation program 5112 may also be stored in the main memory 5100.

Programs and tables which differ from those of the first embodiment will be described hereinbelow in particular detail. The migration-destination volume performance prediction program 5114 is a program which predicts the performance (response time, for example) in a case where data of an optional dynamic Thin Provisioning volume (hereinafter called the 'dynamic virtual volume') is migrated to a dynamic virtual volume which belongs to a different pool. Note that, although the volume serving as the performance prediction target of the migration-destination volume performance prediction program 5114 is a dynamic virtual volume in this embodiment, the embodiment is not limited to this example, rather, the logical volume 1110 described in the first embodiment may also be a normal logical volume 1110a or external connection volume 1110b, for example. In addition, according to this embodiment, the rule for migrating the data of the dynamic virtual volume is a rule according to which the higher the IOPS of the data, the higher the performance of the resources whose segments the data is migrated to, but the embodiment is not limited to this example. Here, an example of performance is a value (G/sec) indicated in a manual or catalogue or the like.

The management physical and logical storage area mapping table 5160B will be described next. As shown in FIG. 20, the management physical and logical storage area mapping table 5160B is a table for managing optional statistical information relating to the configuration of the storage apparatuses 1000. The management physical and logical storage area mapping table 5160B holds information on the average IOPS to the optional assigned segment in addition to the information stored in the management physical and logical storage area mapping table 5160 according to the first embodiment.

More specifically, the average IOPS field 51605 stores average values of the IOPS values of the segments of the optional resource assigned to the volumes. Note that, according to this embodiment, although the IOPS values held in the management physical and logical storage area mapping table 5160B are values for the average IOPS of the assigned segments, statistical information indicating an IO distribution of the 50 percentile, for example, may also be stored.

The management pool physical and logical storage area mapping table 5190 will be described next. The management pool physical and logical storage area mapping table 5190 is a table which manages statistical information relating to the resources in the pool 1120 of the storage apparatuses 1000 and, as shown in FIG. 21, the management pool physical and logical storage area mapping table 5190 is configured from an apparatus identifier field 51900, a pool identifier field 51901, a resource identifier field 51902, a total segment count field 51903, an assigned segment count field 51904, and an average IOPS to the assigned segment field 51905.

The apparatus identifiers field 51900 stores apparatus identifiers which identify the storage apparatuses. The pool identifier field 51901 stores pool identifiers which identify pools. The resource identifier field 51902 stores resource identifier fields identifying resources. The total segment count field 51903 stores the total segment count of the resources. The assigned segment count field 51904 stores the numbers of assigned segments among the segments of the resources. The average IOPS to the assigned segment field stores values for the average IOPS to the assigned segments of optional resources.

The operation of the management computer 5000 according to this embodiment will be described in detail next. Hereinafter, processing pertaining to this embodiment which differs from the first embodiment in particular will be described. Details of the processing of the migration-destination volume performance prediction program 5114 in particular will be described hereinbelow.

Figure 22:
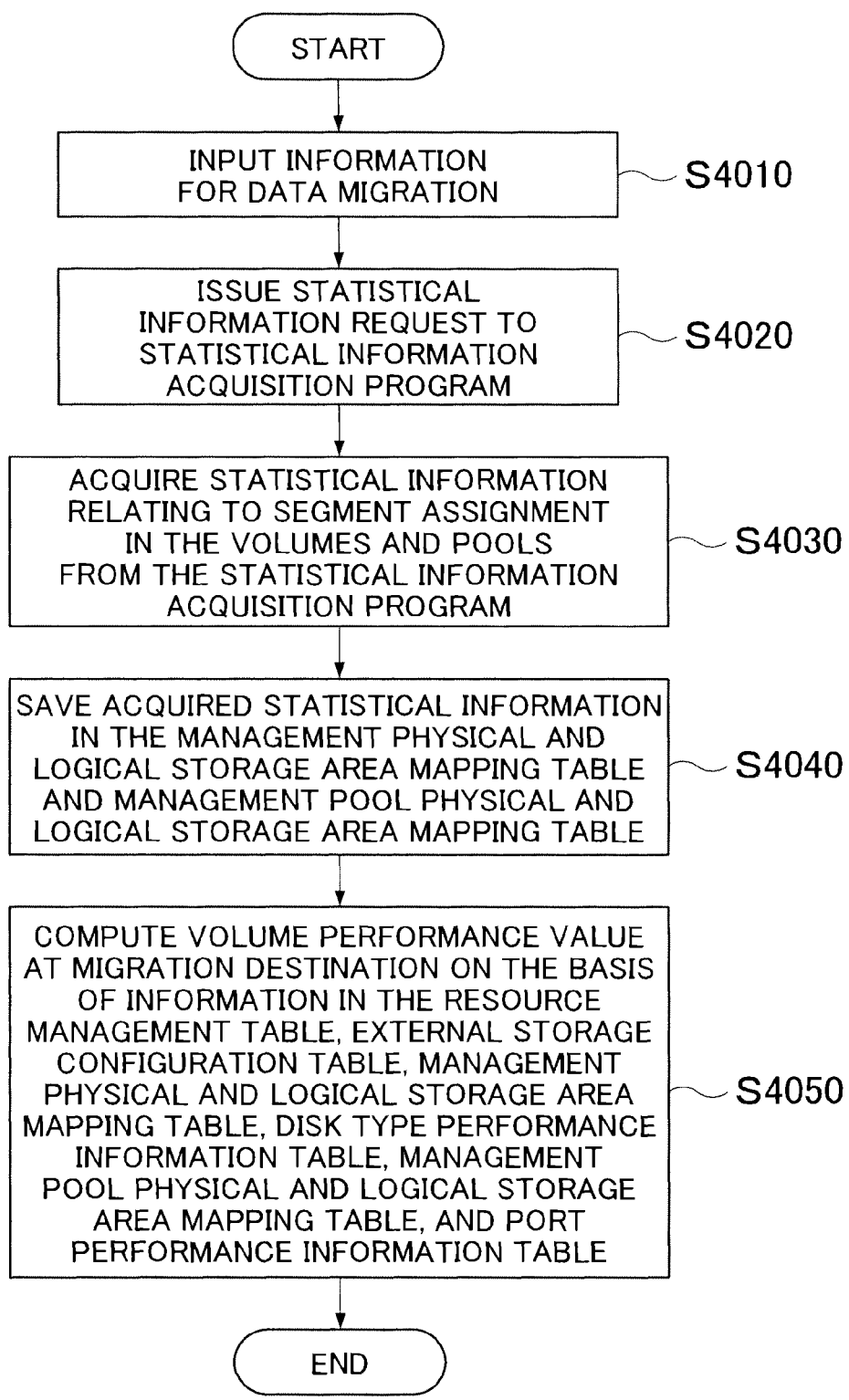
FIG. 22 is a flowchart showing a processing routine for the processing of a migration-destination volume performance prediction program according to the second embodiment.

As shown in FIG. 22, the migration destination volume performance prediction program 5114 first acquires information for data migration that is input by the system administrator via the I/O apparatus 6000 (S4010). Information for data migration is, for example, information on the volume serving as a data migration target (logical volume) and information on the data migration-destination volume, and the like.

The migration-destination volume performance prediction program 5114 subsequently issues a request for statistical information corresponding to a predetermined input to the statistical information acquisition program 5113 (S4020). More specifically, the migration destination volume performance prediction program 5114 supplies, to the statistical information acquisition program 5113, information on the migration-source volume and information on the migration-destination volume which were acquired in step S4010, and units, granularity and type of the statistical information to the statistical information acquisition program 5113, and acquires statistical information which corresponds to an input from the statistical information acquisition program 5113. Here, the units of the statistical information are virtual volumes and pools and the granularity and type of the statistical information are the segment assignment count and average IOPS for each resource. Note that, although the segment assignment count and average IOPS for each resource is exemplified by the granularity and type of the statistical information in this embodiment, the granularity and type may also be a 50-percentile granularity and type.

Furthermore, the migration-destination volume performance prediction program 5114 acquires statistical information relating to the resource assignment of designated volumes acquired in step S2010 (S4030). Note that, although information relating to the resource assignment and average IOPS of the volume is the statistical information acquired in this embodiment, the embodiment is not limited to this example.

The migration-destination volume performance prediction program 5114 subsequently stores the statistical information acquired in step S4030 in the management physical and logical storage area mapping table 5160B and the management pool physical and logical storage area mapping table 5190 (S4040). As described hereinabove, the management physical and logical storage area mapping table 5160B stores, among the information stored in the storage physical and logical storage area mapping table 1212, the average IOPS of each resource and a value obtained by totaling the numbers of segments assigned from resources of the same type. Accordingly, since it is possible to collectively acquire a smaller amount of information than all the information stored in the storage physical and logical storage area mapping table 1212, the amount of transferred data and the transfer time can be greatly shortened.

Furthermore, the migration-destination volume performance prediction program 5114 calculates the performance of the migration-destination dynamic virtual volume on the basis of information stored in the resource management table 5150, the management external storage configuration table 5155, the management physical and logical storage area mapping table 5160B, the disk type performance information table 5170, the port performance information table 5180, and the management pool physical and the logical storage area mapping table 5190 (S4050).

Figure 23:
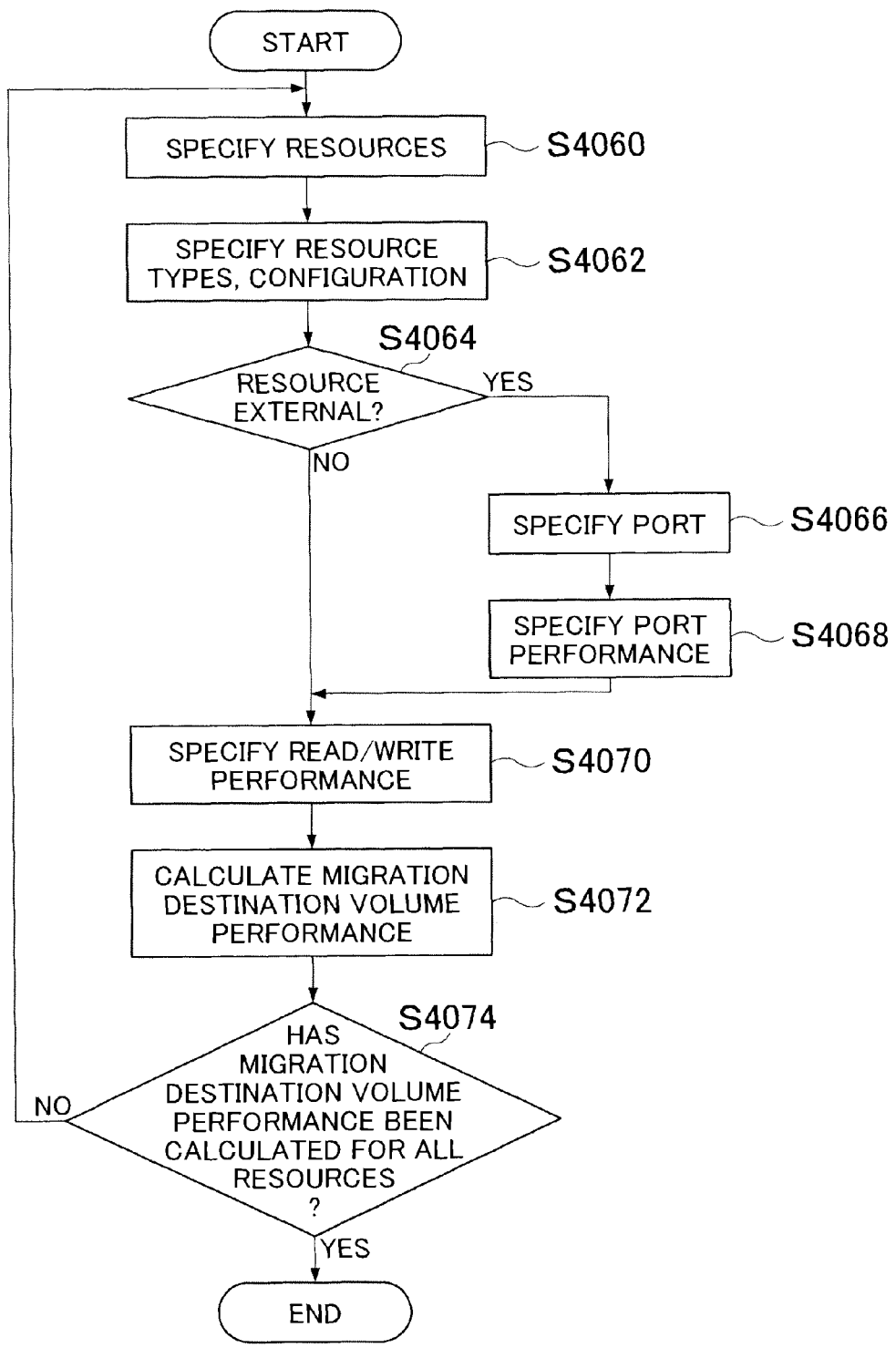
FIG. 23 is a flowchart showing a specific example of a migration-destination volume performance prediction program according to the second embodiment.

A specific example of the migration-destination volume performance prediction processing is described here. As shown in FIG. 23, the migration-destination volume performance prediction program 5114 refers to the management physical and logical storage area mapping table 5160 and specifies the resources constituting the pool corresponding to the migration-destination volume and resources constituting the migration-source volume which are input in step S4010 (S4060).

The migration-destination volume performance prediction program 5114 refers to the resource management table 5150 and specifies the type and configuration of the resources specified in step S4060 (S4062).

The migration-destination volume performance prediction program 5114 then determines whether or not the configuration information specified in step S4062 is external (S4064). If it is determined in step S4064 that the configuration information is external, the migration-destination volume performance prediction program 5114 refers to the management external storage configuration table 5155 and specifies the port, used for the external connection, which corresponds to the specified resource (S4066). Furthermore, the migration-destination volume performance prediction program 5114 refers to the port performance information table 5180 and specifies performance information for the port specified in step S4066 (S4068).

If it is determined in step S4064 that the configuration information is not external, the processing of step S4070 is executed. The migration-destination volume performance prediction program 5114 then refers to the disk type performance information table 5170 and specifies the read/write performance corresponding to the type of resource specified in step S4060 (S4070).

The migration-destination volume performance prediction program 5114 subsequently computes the performance of the migration-destination volume in the migration of the resource specified in step S4060 (S4072). For example, suppose that the migration-source volume is configured from 1000 segments (average IOPS=5000) of a resource 1, 1000 segments (average IOPS=6000) of a resource 2, and 2000 segments (average IOPS=3000) of a resource 3. Furthermore, suppose that it is possible to specify, for the pool corresponding to the migration-destination volume, that all the segments (1000 segments) of a resource 10 are assigned (average IOPS=4000), that all the segments (1000 segments) of a resource 11 are assigned (average IOPS=3000), and that 2000 segments among all 8000 segments of resource 2 are assigned (average IOPS=2500).

In addition, as described earlier, the rule for data migration of a dynamic virtual volume is that the higher the IOPS of the data, the higher the performance of the resource segment the data is migrated to, and hence it can be inferred that high-performance resources are assigned in the following order: the data in resource 2 of the migration-source volume, the data in resource 1 of the migration-source volume, and then the data in migration-destination resource 10, and so on. The performance of the volume at the migration destination can therefore be calculated from the ratio of resources assigned at the migration destination and the media performance on the basis of the inferred result.

For example, the response performance can be calculated by multiplying the average performance of each resource by the ratio with which data is stored in a plurality of resources of varying performance in the migration-destination storage apparatus 1000b. More specifically, it is presumed that, in the migration-destination storage apparatus b, in a 1 TB (1024 GB) data amount, 20% of the data is stored on an SSD, 60% on an FC, and 20% on a SATA. It is also assumed that the average response performance of each resource is 1 (sec) for the SSD, 2 (sec) for the FC, and 3 (sec) for the SATA. In this case, the average response performance of the whole migration-destination storage apparatus 1000b is calculated by the following equation.
[Math 2]

$$1\times(20/100)+2\times(60/100)+3\times(20/100)=2.0 \text{ (sec)} \quad (2)$$

In addition, according to this embodiment, although acquiring IOPS information of each of all the segments from the storage apparatus 1000 enables the volume performance to be estimated highly accurately, the migration-destination volume performance prediction program 5114 is able to acquire more accurate IOPS statistical information by configuring the granularity of the statistical information more accurately in step S4020. Examples of a more precise configuration of the statistical information granularity is the number of segments with an IOPS of 0 to 1000 or the number of segments with an IOPS of 1001 to 2000, and so on. The migration-destination volume performance prediction program 5114 is accordingly able to adjust the data transfer amount and the accuracy of the statistical information.

Note that the time of the previous acquisition in step S4020 may be transmitted to the statistical information creation program 1215 and the statistical information may be acquired only for points where the configuration has changed, since the previous acquisition time, within the range of the statistical information acquired from the statistical information creation program 1215 in step S4030. With this method, the amount of data transferred between the management computer 5000 and the storage apparatuses 1000 can be reduced further.

(4) Further Embodiments

Note that although, in the foregoing embodiments, the control device 5200 of the management computer 5000 implements the various functions of the backup capacity calculation unit, the migration-source data determination unit, the migration-destination storage apparatus determination unit and the data migration instruction unit and so on of the present invention on the basis of various programs stored in the management computer 5000, but the embodiment is not limited to this example. For example, various functions may also be implemented in co-operation with the CPU by providing the control device 5200 in another apparatus separate from the management computer 5000. Furthermore, the various functions may also be implemented by providing the various programs stored in the management computer 5000 in another apparatus separate from the management computer 5000 and as a result of the program being called by the control device 5200.

Furthermore, each of the steps in the processing of the management computer 5000 of this specification need not necessarily be processed in chronological order according to the sequence presented in the flowchart. In other words, the steps in the processing of the management computer 5000 and the like may also be executed in parallel even if the processing is different.

In addition, hardware such as the CPU, ROM, and RAM contained in the management computer 5000 or the like can also be created in the form of computer programs for exhibiting the same functions as each of the foregoing configurations of the management computer 5000. A storage medium storing these computer programs may also be provided.

INDUSTRIAL APPLICABILITY

The present invention can also be applied to a computer system for managing data migration of storage apparatuses, and to a management computer and storage management method.

REFERENCE SIGNS LIST

1000 Storage apparatus
1100 Disk device
1210 Main memory
1211 Configuration management program
1212 Storage physical and logical storage area mapping table
1213 Resource configuration table
1214 Storage external storage configuration table
1215 Statistical information creation program
1220 Control device
1230 Host I/F
1240 Management I/F
1250 Disk I/F
1260 External connection I/F
2000 Host computer
2100 Main memory
2200 Control device
2300 Host I/F
2400 Management I/F
3000 Data network
4000 Management network
5000 Management computer
5100 Main memory
5110 System management program
5112 Data migration required time computation program
5113 Statistical information acquisition program
5150 Resource management table
5155 Management external storage configuration table
5160 Management physical and logical storage area mapping table
5170 Disk type performance information table
5180 Port performance information table
5200 Control device
5300 Management I/F
6000 I/O apparatus

The invention claimed is:

1. A computer system comprising:
a plurality of storage apparatuses;
a plurality of host apparatuses configured to issue a data writing request to the plurality of storage apparatuses; and
a management computer configured to manage the plurality of storage apparatuses and the plurality of host apparatuses,
wherein the plurality of storage apparatuses, the plurality of host apparatuses, and the management computer are interconnected via a network,
wherein at least one storage apparatus of the plurality of storage apparatuses comprises:
a storage device which stores data which is read/written by at least one host apparatus of the plurality of host apparatuses; and
a control device configured to control the data writing to the storage device,
wherein the control device is configured to provide a predetermined storage area of the storage device to the host apparatus as one or more volumes and provide statistical information relating to the storage areas to the management computer in response to a request from the management computer,
wherein a volume of the one or more volumes is a virtual volume configured from different resources having different performances,
wherein the management computer comprises:
a storage device which stores a storage area management table which manages storage areas of the plurality of storage apparatuses, and
a control device configured to manage the configuration of the storage areas of the plurality of storage apparatuses,
wherein the control device of the management computer is configured to provide, to the storage apparatuses, volume units or pool units as units of the statistical information relating to the storage areas, and number of segments assigned for each resource as types and/or granularity of the statistical information or data occupancy in the volumes,
wherein the granularity of statistical information includes the number of segments assigned for each different resource,
wherein the control device of the at least one storage apparatus is configured to generate the statistical information relating to the storage areas based on the units, types and/or granularity of the statistical information relating to the storage areas provided to the management computer,
wherein the control device of the management computer is configured to calculate information relating to data configuration of the storage apparatuses based on the statistical information relating to the storage areas of the storage apparatuses and which is provided by the storage apparatuses,
wherein the control device of the at least one storage apparatus is configured to manage changes in configuration information and performance information of the storage areas of the storage device and provide, to the management computer, the statistical information relating to the storage areas based on an update in response to a request from the management computer, and
wherein the control device of the management computer is configured to manage the data configuration of the plurality of storage apparatuses by using the statistical information.

2. The computer system according to claim 1, wherein the control device of the at least one storage apparatus is configured to assign an unassigned area among the storage areas to the data storage area of the volume in response to a write request by the host apparatus, and wherein the control device of the management computer is configured to manage the data configuration stored in the volume of the at least one storage apparatus.

3. The computer system according to claim 1, wherein the control device of the at least one storage apparatus is configured to dynamically change assignment of the data stored in the volume to which the storage area is already assigned to the storage area of a different performance depending on the state of access to the data, and wherein the control device of the management computer is configured to manage the data configuration stored in the volume of the at least one storage apparatus.

4. The computer system according to claim 1, wherein the control device of the management computer is configured to calculate a data migration required time when the data stored in the volume of the at least one storage apparatus is migrated to another volume on the basis of the statistical information relating to the storage areas of the at least one storage apparatus which is provided by the at least one storage apparatus.

5. The computer system according to claim 1, wherein the control device of the management computer is configured to calculate the data access performance, when data stored in the volume of the at least one storage apparatus is migrated to another volume, of the other migration-destination volume, on the basis of the statistical information relating to the storage areas of the at least one storage apparatus provided by the at least one storage apparatus.

6. The computer system according to claim 1, wherein the control device of the management computer is configured to manage the data configuration of the plurality of storage apparatuses on the basis of the statistical information, provided by the plurality of storage apparatuses, which relates to the storage areas of the plurality of storage apparatuses.

7. A management computer in which a plurality of storage apparatuses and a plurality of host apparatuses that issue a data writing request to the plurality of storage apparatuses are interconnected via a network,
wherein at least one storage apparatus of the plurality of storage apparatuses is configured to
provide a predetermined storage area of the at least one storage apparatus to a host apparatus of the plurality of host apparatuses as one or more volumes,
wherein a volume of the one or more volumes is a virtual volume configured from different resources having different performances,
manage changes in configuration information and performance information of storage areas of the at least one storage apparatus, and
provide statistical information relating to the storage areas based on an update to the management computer in response to a request from the management computer,
wherein the management computer comprises a storage device that stores a storage area management table for managing the storage area of the plurality of storage apparatuses and a control device configured to manage the configuration of the storage areas of the plurality of storage apparatuses, and wherein the control device is configured:
to provide, to the plurality of storage apparatuses, volume units or pool units as units of the statistical information relating to the storage areas, and number of segments assigned for each resource as types and/or granularity of the statistical information or data occupancy in the volumes,
wherein the granularity of statistical information includes the number of segments assigned for each different resource, and
to calculate information relating to data configuration of the storage apparatuses based on the statistical information relating to the storage areas of the storage apparatuses based on units, types and/or granularity of the statistical information relating to the storage areas and which is provided by the storage apparatuses, and
wherein the control device is configured to manage the data configuration of the plurality of storage apparatuses by using the statistical information.

8. A storage management method of a computer system in which a plurality of storage apparatuses, a plurality of host apparatuses which issue a data writing request to the plurality of storage apparatuses, and a management computer which manages the plurality of storage apparatuses and plurality of host apparatuses are interconnected via a network, comprising:
a first step in which at least one storage apparatus of the plurality of storage apparatuses provides a predetermined storage area of the at least one storage apparatus to a host apparatus of the plurality of host apparatuses as one or more volumes,
wherein a volume of the one or more volumes is a virtual volume configured from different resources having different performances;
a second step in which the management computer issues a request for statistical information relating to storage areas to the at least one storage apparatus;
a third step in which the at least one storage apparatus provides the statistical information relating to the storage areas to the management computer in response to the request from the management computer;
a fourth step in which the management computer manages data configuration of the plurality of storage apparatuses by using statistical information;
a fifth step in which the management computer provides, to the storage apparatuses, volume units or pool units as units of the statistical information relating to the storage areas, and number of segments assigned for each resource as types and/or granularity of the statistical information or data occupancy in the volumes,
wherein the granularity of statistical information includes the number of segments assigned for each different resource;
a sixth step in which the at least one storage apparatus generates the statistical information relating to the storage areas based on units, types and/or granularity of the statistical information relating to the storage areas provided to the management computer; and
a seventh step in which the management computer calculates information relating to the data configuration of the storage apparatuses based on the statistical information relating to the storage areas of the storage apparatuses and which is provided by the storage apparatuses, and
wherein the at least one storage apparatus manages changes in configuration information and performance information of the storage areas of the at least one storage apparatus and provide, to the management computer, the statistical information relating to the storage areas based on an update in response to a request from the management computer.

* * * * *